United States Patent
Griffis et al.

(10) Patent No.: US 11,492,279 B2
(45) Date of Patent: Nov. 8, 2022

(54) REGULATION OF PROCESS STREAM COMPOSITION FOR IMPROVED ELECTROLYZER PERFORMANCE

(71) Applicant: Evoqua Water Technolgies LLC, Pittsburgh, PA (US)

(72) Inventors: Joshua Griffis, Ashburnham, MA (US); Simon P. Dukes, Chelmsford, MA (US); Ll-Shiang Liang, Harvard, MA (US); Darren Dale, Chesterfield (GB); Michael Shaw, Derry, NH (US); Paul Beddoes, Shirehampton (GB); George Y. Gu, Andover, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/976,470

(22) PCT Filed: Feb. 27, 2019

(86) PCT No.: PCT/US2019/019796
§ 371 (c)(1),
(2) Date: Aug. 27, 2020

(87) PCT Pub. No.: WO2019/168955
PCT Pub. Date: Sep. 6, 2019

(65) Prior Publication Data
US 2021/0047217 A1    Feb. 18, 2021

Related U.S. Application Data

(60) Provisional application No. 62/735,505, filed on Sep. 24, 2018, provisional application No. 62/635,731, filed on Feb. 27, 2018.

(51) Int. Cl.
*B01D 61/02* (2006.01)
*B01D 61/46* (2006.01)
(Continued)

(52) U.S. Cl.
CPC .............. *C02F 9/00* (2013.01); *B01D 61/027* (2013.01); *B01D 61/445* (2013.01); *B01D 61/46* (2013.01);
(Continued)

(58) Field of Classification Search
CPC .... B01D 61/027; B01D 61/445; B01D 61/58; B01D 2311/2684; C02F 1/4693; C02F 9/00
See application file for complete search history.

(56) References Cited

U.S. PATENT DOCUMENTS

| 2010/0282689 | A1 | 11/2010 | Ganzi et al. |
| 2014/0290484 | A1* | 10/2014 | Weston ................... C02F 1/442 95/259 |
| 2018/0230026 | A1* | 8/2018 | Raynel .................. C02F 1/4674 |

FOREIGN PATENT DOCUMENTS

| RU | 2403301 C1 | 11/2010 |
| WO | 2007132477 A1 | 11/2007 |
| WO | 2017049052 A1 | 3/2017 |

OTHER PUBLICATIONS

Yang, Yang, et al. "An innovative beneficial reuse of seawater concentrate using bipolar membrane electrodialysis." journal of membrane science 449 (2014): 119-126. (Year: 2014).*

* cited by examiner

*Primary Examiner* — Bradley R Spies

(57) ABSTRACT

An electrochlorination system includes an electrolyzer fluidically connectable between a source of feed fluid and a product fluid outlet, and a sub-system configured to one of increase a pH of the feed fluid, or increase a ratio of monovalent to divalent ions in the feed fluid, upstream of the electrolyzer.

10 Claims, 25 Drawing Sheets

(51) Int. Cl.
  *B01D 61/58*     (2006.01)
  *C02F 1/44*      (2006.01)
  *C02F 1/461*     (2006.01)
  *C02F 1/469*     (2006.01)
  *C02F 9/00*      (2006.01)
  *B01D 61/44*     (2006.01)
  *C02F 1/467*         (2006.01)

(52) U.S. Cl.
  CPC .......... *B01D 61/58* (2013.01); *B01D 2311/04* (2013.01); *B01D 2311/2665* (2013.01); *B01D 2311/2684* (2013.01); *C02F 1/442* (2013.01); *C02F 1/4674* (2013.01); *C02F 1/4693* (2013.01); *C02F 1/46104* (2013.01); *C02F 2209/005* (2013.01)

| Flow Rate (m³/hr) | 22 |
|---|---|
| Cell Output (kg/hr) | 2.2 |
| Pump Discharge Pressure (Barg) | 8 |
| Pressure Loss from Pump (Barg) | 0.25 |
| Hydrogen Generation/kg Hypo (m³/hr) | 0.45 |
| H₂ Solubility in Water (m³/hr @ 1 BarA) | 0.44 |

| Constant | Value | Unit |
|---|---|---|
| Cell Half Length | 0.6 | m |
| Current Density | 1800 | A/m² |
| Electrode Area | 0.91 | m²/cell |
| Electrolyzer Size | 20 | cells |
| Flow Rate | 22 | m³/hr |
| 1 Faraday | 26.81 | A/hr |
| Molar Mass Cl₂ | 70.91 | g/mol |
| Molar Mass H₂ | 2.02 | g/mol |
| Molar Mass OH⁻ | 17.01 | g/mol |
| 1 g/hr Cl₂ | 0.76 | A |
| 1 g/hr H₂ | 26.59 | A |
| 1 g/hr OH⁻ | 1.58 | A |

FIG. 3A

| Total Hardness | Value | Units |
|---|---|---|
| Na⁺ TDS | 10,750 | ppm |
| Cl⁻ TDS | 19,350 | ppm |
| Mg²⁺ TDS | 1,290 | ppm |
| Ca²⁺ TDS | 410 | ppm |

| Na⁺ | Cl⁻ | Mg²⁺ | Ca²⁺ |
|---|---|---|---|
| kg/hr | kg/hr | kg/hr | kg/hr |
| 236.5 | 425.7 | 28.38 | 9.02 |

*FIG. 3B*

| Cell No. | Cell Inlet Pressure Barg | Pressure Drop Thru Cell Barg | Cell Outlet Pressure Barg | Hydrogen Generation m³/hr (atmos) | Hydrogen Volume at Line Pressure m³/hr | Dissolvable Hydrogen m³/hr | Hydrogen in Cell m³/hr | Hydrogen in the Cell % |
|---|---|---|---|---|---|---|---|---|
| 1 | 7.75 | 0.28 | 7.48 | 0.99 | 0.12 | 3.85 | -3.73 | -17% |
| 2 | 7.48 | 0.28 | 7.19 | 1.98 | 0.24 | 3.73 | -3.49 | -16% |
| 3 | 7.19 | 0.28 | 6.91 | 2.97 | 0.38 | 3.61 | -3.23 | -15% |
| 4 | 6.91 | 0.29 | 6.62 | 3.96 | 0.52 | 3.48 | -2.96 | -13% |
| 5 | 6.62 | 0.29 | 6.33 | 4.95 | 0.68 | 3.35 | -2.68 | -12% |
| 6 | 6.33 | 0.30 | 6.03 | 5.94 | 0.84 | 3.22 | -2.38 | -11% |
| 7 | 6.03 | 0.30 | 5.73 | 6.93 | 1.03 | 3.09 | -2.06 | -9% |
| 8 | 5.73 | 0.31 | 5.42 | 7.92 | 1.23 | 2.96 | -1.73 | -8% |
| 9 | 5.42 | 0.31 | 5.11 | 8.91 | 1.46 | 2.83 | -1.37 | -6% |
| 10 | 5.11 | 0.32 | 4.79 | 9.9 | 1.71 | 2.69 | -0.98 | -4% |
| 11 | 4.79 | 0.32 | 4.47 | 10.89 | 1.99 | 2.55 | -0.56 | -3% |
| 12 | 4.47 | 0.33 | 4.15 | 11.88 | 2.31 | 2.41 | -0.10 | 0% |
| 13 | 4.15 | 0.33 | 3.82 | 12.87 | 2.67 | 2.26 | 0.41 | 2% |
| 14 | 3.82 | 0.34 | 3.48 | 13.86 | 3.09 | 2.12 | 0.97 | 4% |
| 15 | 3.48 | 0.34 | 3.14 | 14.85 | 3.59 | 1.97 | 1.61 | 7% |
| 16 | 3.14 | 0.35 | 2.80 | 15.84 | 4.17 | 1.82 | 2.35 | 11% |
| 17 | 2.80 | 0.35 | 2.4 | 16.83 | 4.89 | 1.67 | 3.22 | 15% |
| 18 | 2.44 | 0.36 | 2.09 | 17.82 | 5.77 | 1.52 | 4.25 | 19% |
| 19 | 2.09 | 0.36 | 1.73 | 18.81 | 6.90 | 1.36 | 5.54 | 25% |
| 20 | 1.73 | 0.37 | 1.36 | 19.8 | 8.39 | 1.20 | 7.19 | 33% |

*FIG. 3C*

Unit Generation Rates:

| Cell# | Cl$_2$ kg/hr | Cl$_2$ ppm | H$_2$ kg/hr | H$_2$ ppm | OH⁻ kg/hr | OH⁻ ppm |
|---|---|---|---|---|---|---|
| 1 | 2.2 | 98.7 | 0.06 | 2.8 | 1.04 | 47.4 |
| 2 | 4.3 | 197.4 | 0.12 | 5.6 | 2.08 | 94.7 |
| 3 | 6.5 | 296.2 | 0.19 | 8.4 | 3.13 | 142.1 |
| 4 | 8.7 | 394.9 | 0.25 | 11.2 | 4.17 | 189.4 |
| 5 | 10.9 | 493.6 | 0.31 | 14.0 | 5.21 | 236.8 |
| 6 | 13.0 | 592.3 | 0.37 | 16.8 | 6.25 | 284.2 |
| 7 | 15.2 | 691.1 | 0.43 | 19.6 | 7.29 | 331.5 |
| 8 | 17.4 | 789.8 | 0.49 | 22.5 | 8.34 | 378.9 |
| 9 | 19.5 | 888.5 | 0.56 | 25.3 | 9.38 | 426.3 |
| 10 | 21.7 | 987.2 | 0.62 | 28.1 | 10.42 | 473.6 |
| 11 | 23.9 | 1086.0 | 0.68 | 30.9 | 11.46 | 521.0 |
| 12 | 26.1 | 1184.7 | 0.74 | 33.7 | 12.50 | 568.3 |
| 13 | 28.2 | 1283.4 | 0.80 | 36.5 | 13.55 | 615.7 |
| 14 | 30.4 | 1382.1 | 0.86 | 39.3 | 14.59 | 663.1 |
| 15 | 32.6 | 1480.9 | 0.93 | 42.1 | 15.63 | 710.4 |
| 16 | 34.8 | 1579.6 | 0.99 | 44.9 | 16.67 | 757.8 |
| 17 | 36.9 | 1678.3 | 1.05 | 47.7 | 17.71 | 805.1 |
| 18 | 39.1 | 1777.0 | 1.11 | 50.5 | 18.76 | 852.5 |
| 19 | 41.3 | 1875.8 | 1.17 | 53.3 | 19.80 | 899.9 |
| 20 | 43.4 | 1974.5 | 1.23 | 56.1 | 20.84 | 947.2 |

*FIG. 3D*

Rejection values recorded for the main seawater ions, as a function of the recovery (membrane type: DS-5 DL, pressure: 14 bars, feed flow rate: 60 l/h m²; temperature range: 25–27 °C; permeate flux range: 19.2–18.0 l/h m²).

| Recovery (%) | Cl(-I) (%) | Na(I) (%) | Ca(II) (%) | Mg(II) (%) | K(I) (%) | HCO₃(-I) (%) |
|---|---|---|---|---|---|---|
| 10 | 28.4 ± 4.0 | 4.3 ± 2.6 | 100.0 ± 0 | 100.0 ± 0 | 32.7 ± 12.5 | 37.7 ± 0.9 |
| 40 | 14.2 ± 0.1 | 2.0 ± 1.5 | 60.7 ± 5.1 | 98.2 ± 2.5 | 9.1 ± 7.1 | 37.7 ± 0.5 |
| 50 | 11.7 ± 0 | 2.6 ± 1.4 | 58.3 ± 1.1 | 98.2 ± 0.2 | 4.8 ± 0.5 | 36.4 ± 2.2 |
| 55 | 10.6 ± 0 | 1.6 ± 0.6 | 58.2 ± 6.1 | 92.6 ± 3.8 | 4.7 ± 2.3 | 35.6 ± 1.8 |
| 60 | 10.2 ± 0.4 | 3.1 ± 1.5 | 54.6 ± 0 | 92.9 ± 0.2 | 6.1 ± 1.9 | 33.8 ± 1.6 |
| 63 | 9.6 ± 0.3 | 1.8 ± 0.3 | 49.7 ± 0.8 | 95.0 ± 7.1 | 5.7 ± 1.3 | 33.7 ± 1.5 |
| 66 | 9.3 ± 0.2 | 1.3 ± 0.7 | 46.4 ± 3.7 | 89.5 ± 1.3 | 5.6 ± 1.0 | 32.6 ± 0.1 |
| 69 | 9.1 ± 0.5 | 1.4 ± 0.1 | 47.0 ± 0.5 | 91.4 ± 8.7 | 4.9 ± 1.5 | 30.0 ± 1.5 |
| 72 | 8.5 ± 1.3 | 1.1 ± 0.3 | 45.1 ± 1.3 | 89.2 ± 4.0 | 4.4 ± 1.2 | 30.2 ± 1.9 |
| 75 | 8.3 ± 0.6 | 0.4 ± 0.8 | 41.8 ± 1.3 | 83.4 ± 5.4 | 4.1 ± 2.2 | 31.2 ± 5.9 |
| 78 | 6.5 | 0.8 | 38.8 | 71.5 | 3.1 | 21.6 |

*FIG. 5*

| Mean Concentration of major ions in Instant Ocean® synthetic seawater at approximate salinity of 35 ppt ||
|---|---|
| Ion | Concentration (ppm) |
| Chloride | 19,290 |
| Sodium | 10,780 |
| Magnesium | 1,320 |
| Potassium | 420 |
| Calcium | 400 |
| Carbonate/bicarbonate | 200 |
| Bromide | 56 |
| Strontium | 8.8 |
| Fluoride | 1 |
| Iodide | 0.24 |

*FIG. 15B*

| HYPOCHLORITE CONC. (VIA TITRATION) | | | | | |
|---|---|---|---|---|---|
| Conc. Theoretical (ppm) | 8000 | 4000 | 2000 | 1000 | 300 |
| Conc. Det.#1 (mg/L) | 6134 | 3503 | 2191 | 1276 | 789 |
| Conc. Det.#2 (mg/L) | 6162 | 3517 | 2141 | 1276 | 785 |
| Conc. Average (mg/L) | 6148 | 3510 | 2166 | 1276 | 787 |
| Titration Volume (mL) | 5 | 5 | 5 | 20 | 20 |
| Deviation % | -23.2 | -12.2 | 8.3 | 27.6 | 162.4 |

| HYPOCHLORITE CONC. (VIA ABSORBANCE) | | | | | |
|---|---|---|---|---|---|
| 385 nm | 0.233 | 0.161 | 0.122 | 0.099 | 0.088 |
| 390 nm | 0.166 | 0.117 | 0.091 | 0.075 | 0.067 |
| 395 nm | 0.123 | 0.089 | 0.069 | 0.058 | 0.053 |
| pH | 8.79 | 8.79 | 8.76 | 8.67 | 8.74 |

| 3.5% I.O. (ABSORBANCE) | |
|---|---|
| 385 nm | 0.02 |
| 390 nm | 0.019 |
| 395 nm | 0.018 |

| RECIRCULATING HYPOCHLORITE GENERATION EXPERIMENTAL PARAMETERS | | | | | |
|---|---|---|---|---|---|
| Temperature (C) | 20 | 20 | 20 | 20 | 20 |
| Flow Rate (L/min) | 0.6 | 0.6 | 0.6 | 0.6 | 0.6 |
| Time of Operation (hrs) | 2.08 | 1.18 | 0.83 | 0.42 | 0.12 |
| V DC | 11.62 | 11.8 | 9.81 | 9.5 | 9.5 |
| A DC | 12 | 12 | 8.3 | 8.3 | 8.3 |
| Feed Conductivity (mS) | 45.8 | 45.1 | 45.3 | 45.25 | 45.06 |
| Volume (L) | 6 | 8 | 8 | 8 | 8 |
| Titration #1 (mL) | 8.65 | 4.94 | 3.09 | 7.2 | 4.45 |
| Titration #2 (mL) | 8.69 | 4.96 | 3.02 | 7.2 | 4.43 |

| EXPERIMENTAL NOTES |
|---|
| 3.5% Instant Ocean (I.O.) solution prepared with RO water |
| 1mol NaClO equivalent to 1mol $Cl_2$ (MW=70.91g/mol) |
| $Na_2S_2O_3$ Conc. = 0.1M |

*FIG. 15C*

REGULATION OF PROCESS STREAM COMPOSITION FOR IMPROVED ELECTROLYZER PERFORMANCE

CROSS-REFERENCE TO RELATED APPLICATION

This application claims priority under 35 U.S.C. § 119(e) to U.S. Provisional Application Ser. No. 62/635,731, titled "REGULATION OF PROCESS STREAM COMPOSITION FOR IMPROVED ELECTROLYZER #PERFORMANCE," filed on Feb. 27, 2018, which is incorporated herein by reference in its entirety for all purposes.

BACKGROUND

1. Field of Invention

Aspects and embodiments disclosed herein are generally directed to electrochemical devices, and more specifically, to electrochlorination cells and devices and systems and methods of utilizing same.

2. Discussion of Related Art

Electrochemical devices used to produce a product solution from a feed stream by chemical reactions at electrodes are widely used in industrial and municipal implementations. Examples of reactions include:

A1. Electrochlorination with generation of sodium hypochlorite from sodium chloride and water.
  Reaction at anode: $2Cl^- \rightarrow Cl_2 + 2e^-$
  Reaction at cathode: $2Na^+ + 2H_2O + 2e^- \rightarrow 2NaOH + H_2$
  In solution: $Cl_2 2OH^- \rightarrow ClO^- + Cl^- + H_2O$
  Overall reaction: $NaCl + H_2O \rightarrow NaOCl + H_2$
  $E^o_{ox} = -1.36$ V (Chlorine generation)
  $E^o_{red} = -0.83$ V (Hydrogen generation)
  $E^o_{cell} = -2.19$ V A2. Precipitate Reaction Conditions.
  Magnesium Hydroxide: $Mg^{2+} + 2OH^- \rightarrow Mg(OH)_2$
  Calcium Carbonate: $Ca^{2+} + CO_3^{2-} \rightarrow CaCO_3$ B. Generation of sodium hydroxide and chlorine from sodium chloride and water, with a cation exchange membrane separating the anode and the cathode:
  Reaction at anode: $2Cl^- \rightarrow Cl_2 + 2e^-$
  Reaction at cathode: $2H_2O + 2e^- \rightarrow 2OH^- + H_2$
  Overall reaction: $2NaCl + 2H_2O \rightarrow 2NaOH + Cl_2 + H_2$ C. Vanadium redox battery for energy storage, with a proton permeable membrane separating the electrodes:
During Charging:
  Reaction at 1st electrode: $V^{3+} + e^- \rightarrow V^{2+}$
  Reaction at 2nd electrode: $V^{4+} \rightarrow V^{5+} + e^-$
During Discharging:
  Reaction at 1st electrode: $V^{2+} \rightarrow V^{3+} + e^-$
  Reaction at 2nd electrode: $V^{5+} + e^- \rightarrow V^{4+}$ In some implementations, electrochlorination devices may be utilized to generate sodium hypochlorite from sodium chloride present in seawater.

SUMMARY

In accordance with an aspect of the present invention, there is provided an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area.

In some embodiments, the electrochemical cell has an overall electrode packing density of at least about 2 $mm^{-1}$.

In some embodiments, the electrochemical cell further comprises a central core element disposed within the electrochemical cell and configured to block flow of fluid through a portion of the electrochemical cell along the central axis, the central core element unconnected to at least one electrode of the anode-cathode pair.

In some embodiments, the anode-cathode pair is spiral-wound about the central axis.

In some embodiments, the electrochemical cell further comprises one or more spiral-wound bipolar electrodes. In some embodiments, the anode is laterally displaced from the cathode along a length of the electrochemical cell.

In some embodiments, at least one of the anode and the cathode is a rigid electrode. The anode and the cathode may each include a titanium plate, and surfaces of the anode may be coated with an oxidation resistant coating selected from the group consisting of platinum and a mixed metal oxide. The anode and the cathode may each comprise one or more of titanium, nickel, and aluminum. Surfaces of the anode may be coated with an oxidation resistant coating selected from the group consisting of platinum, a mixed metal oxide, magnetite, ferrite, cobalt spinel, tantalum, palladium, iridium, gold, and silver. At least one of the anode and the cathode may be fluid permeable and/or may include a perforated titanium plate.

In some embodiments, the electrochemical cell further comprises a separator configured to maintain a gap distance between the anode and the cathode, the separator being open to flow of an electrolyte solution through the active area. The separator may include a hub having spokes with slots that engage edges of at least one of the anode and the cathode. The hub may further include an electrical connector configured to electrically connect the one of the anode and the cathode to a source of current.

In some embodiments, the electrochemical cell further comprises a hub including spokes in electrical contact with one of the anode and the cathode. The spokes may include slots that engage edges of the one of the anode and the cathode and maintain a gap between turns of the spiral wound anode-cathode pair.

In some embodiments, the central core element comprises a non-conductive core disposed within an innermost winding of the anode-cathode pair.

In some embodiments, the anode-cathode pair includes a plurality of concentric electrode tubes and gaps defined between adjacent electrode tubes. The plurality of concentric electrode tubes may include one of a plurality of anode electrode tubes and a plurality of cathode electrode tubes. One of the plurality of anode electrode tubes and the plurality of cathode electrode tubes may be rigid electrodes.

In some embodiments, the plurality of concentric tube electrodes includes a plurality of anode electrode tubes and a plurality of cathode electrode tubes.

In some embodiments, the electrochemical cell is configured to enable current (DC and/or AC) to flow through an electrolyte solution from an anode electrode tube to a cathode electrode tube in a single pass.

In some embodiments, the electrochemical cell further comprises a bipolar electrode tube disposed between an anode electrode tube and a cathode electrode tube.

In some embodiments, an anode electrode tube is laterally displaced along a length of the electrochemical cell from a cathode electrode tube having a same diameter as the anode electrode tube. The electrochemical cell may comprise an electrode tube including an anodic half and a cathodic half.

In some embodiments, the electrochemical cell further comprises a plurality of bipolar electrode tubes disposed between respective concentrically arranged adjacent pairs of anode electrode tubes and cathode electrode tubes.

In some embodiments, at least one of the plurality of anode electrode tubes and the plurality of cathode electrode tubes is perforated and/or fluid permeable.

In some embodiments, the electrochemical cell further comprises at least one separator positioned between adjacent electrode tubes, the at least one separator configured to define and maintain a gap between the adjacent electrode tubes. The separator may be open to flow of an electrolyte solution through the gap defined between the adjacent electrode tubes.

In some embodiments, the electrochemical cell further comprises a metallic hub including spokes electrically coupled to edges of a plurality of the concentric electrode tubes. Each spoke may include slots that engage the edges of the plurality of the concentric electrode tubes maintain gaps between adjacent electrode tubes in the plurality of the concentric electrode tubes.

In some embodiments, the central core element includes an end cap disposed within an end of an innermost concentric tube electrode of the electrochemical cell.

In some embodiments, the electrochemical cell has an obround cross section.

In some embodiments, the electrochemical cell further comprises an electrical connector in electrical communication with one of the anode and the cathode, the electrical connector including at least two materials having different degrees of resistance to chemical attack by an electrolyte solution. The at least two materials may include a first material and a second material and the electrical connector may include a fluid permeable body formed of the first material. The fluid permeable body may include a plurality of apertures.

In some embodiments, the electrochemical cell includes a plate or body of the second material coupled to the fluid permeable body formed of the first material with one or more mechanical fasteners.

In some embodiments, the electrochemical cell includes a plate or body of the second material coupled to the fluid permeable body formed of the first material with a compression fit.

In some embodiments, the electrochemical cell includes a plate or body of the second material coupled to the fluid permeable body formed of the first material with threads formed in an edge of the fluid permeable body formed of the first material.

In some embodiments, the electrochemical cell includes a body formed of the second material coupled to the fluid permeable body formed of the first material with threads formed in cylindrical portion of the body formed of the second material.

In some embodiments, the electrochemical cell includes a body formed of the second material welded to the body formed of the first material.

In accordance with another aspect, there is provided a system comprising an electrochemical cell. The electrochemical cell comprises a housing having an inlet, an outlet, and a central axis and an anode-cathode pair disposed substantially concentrically within the housing about the central axis and defining an active area between an anode and a cathode of the anode-cathode pair, an active surface area of at least one of the anode and the cathode having a surface area greater than a surface area of an internal surface of the housing, the anode-cathode pair configured and arranged to direct all fluid passing through the electrochemical cell axially through the active area. The system further comprises a source of electrolyte in fluid communication with the electrochemical cell. The electrochemical cell is configured to produce one or more reaction products from electrolyte from the source of electrolyte and to output the one or more reaction products. The system further comprises a point of use for the one or more reaction products output by the electrochemical cell. The one or more reaction products may include a disinfectant. The disinfectant may include or consist essentially of sodium hypochlorite.

In some embodiments, the source of electrolyte comprises one of brine and seawater.

In some embodiments, the system is included in one of a ship and an oil platform.

In some embodiments, the point of use includes one of a cooling water system and a ballast tank.

In some embodiments, the system is included in a land-based oil drilling system, wherein the point of use is a downhole of the oil drilling system.

In accordance with another aspect, there is provided an electrochemical cell. The electrochemical cell includes a cathode and an anode disposed in a housing and defining a gap therebetween, each of the cathode and anode including arcuate portions, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap.

In some embodiments, the anode includes a plurality of plates extending from an arcuate base and the cathode includes a plurality of plates extending from an arcuate base, the plurality of plates of the anode interleaved with the plurality of plates of the cathode.

In accordance with another aspect, there is provided an electrochemical cell. The electrochemical cell includes a cathode and an anode disposed in a housing and defining a gap therebetween, each of the cathode and anode including a portion conforming to respective portions of an internal surface of the housing, an active surface area of the anode being greater than a surface area of an internal surface of the housing and an active surface area of the cathode being greater than a surface area of an internal surface of the housing, the cathode and anode configured and arranged to direct all fluid passing through the electrochemical cell axially through the gap. At least one of the anode and the cathode may include a corrugated portion.

In accordance with another aspect, there is provided an electrochlorination system. The system comprises an electrolyzer fluidically connectable between a source of feed fluid and a product fluid outlet, and a sub-system configured to one of increase a pH of the feed fluid, or increase a ratio of monovalent to divalent ions in the feed fluid, upstream of the electrolyzer.

In some embodiments, the sub-system comprises a nanofiltration unit having an inlet fluidly connectable to the source of feed fluid and configured to separate the feed fluid into a retentate and a permeate, the retentate having a higher ratio of divalent ions to monovalent ions than the permeate, and a permeate outlet configured to provide the permeate to an inlet of the electrolyzer.

In some embodiments, the nanofiltration unit is configured to produce the permeate with a monovalent ion concentration of from 2% to 10% lower than a monovalent ion concentration in the feed fluid.

In some embodiments, the nanofiltration unit is configured to produce the permeate with a divalent ion concentration of from 50% to 90% lower than a divalent ion concentration in the feed fluid.

In some embodiments, the sub-system comprises an electrodialysis unit having an inlet fluidly connectable to the source of feed fluid, one or more monovalent selective membranes, and a concentrate stream outlet in fluid communication with an inlet of the electrolyzer. The electrodialysis unit may be configured to separate the feed fluid into a diluate stream and a concentrate stream and preferentially transport monovalent ions from the diluate stream to the concentrate stream. The electrodialysis unit may be configured to increase a concentration of monovalent ions in the concentrate stream by from 3% to 400% relative to the feed liquid.

In some embodiments, the sub-system comprises an electrodialysis unit having an inlet fluidly connectable to the source of feed fluid, one or more bipolar membranes, and an outlet configured to provide a fluid stream having an increased acidity relative to the feed fluid to an inlet of the electrolyzer.

In some embodiments, the sub-system comprises an electrodialysis unit having an inlet fluidly connectable to the source of feed fluid, one or more bipolar membranes, and an outlet configured to provide a fluid stream having an increased acidity relative to the feed fluid to an inlet of a nanofiltration unit disposed upstream of the electrolyzer. The nanofiltration unit may be configured to separate the fluid stream into a retentate and a permeate, the retentate having a higher ratio of divalent ions to monovalent ions than the permeate and includes a permeate outlet configured to provide the permeate to an inlet of the electrolyzer.

In some embodiments, the sub-system comprises a nanofiltration unit having an inlet fluidly connectable to the source of feed fluid and an outlet in fluid communication with an electrodialysis unit, the electrodialysis unit including one or more monovalent selective membranes and a concentrate stream outlet in fluid communication with an inlet of the electrolyzer. The system may further comprise an oxygen saturation unit in fluid communication between the electrodialysis unit and the electrolyzer and configured to add oxygen to the concentrate stream prior to the concentrate stream entering the inlet of the electrolyzer.

In some embodiments, the sub-system comprises an electrodialysis unit having an inlet fluidly connectable to the source of feed fluid, one or more monovalent selective membranes, a diluate stream outlet in fluid communication with an inlet of a nanofiltration unit, a concentrate stream inlet in fluid communication with a permeate outlet of the nanofiltration unit, and a concentrate stream outlet in fluid communication with an inlet of the electrolyzer.

In accordance with another aspect, there is provided a method of operating an electrochlorination system. The method comprises operating a sub-system in fluid communication between a source of feed fluid and an electrolyzer to one of increase a pH of the feed fluid, or increase a ratio of monovalent to divalent ions in the feed fluid, to form a modified feed fluid, and introducing the modified feed fluid into the electrolyzer.

In some embodiments, operating the sub-system includes separating the feed fluid in a nanofiltration unit into a retentate and a permeate, the retentate having a higher ratio of divalent ions to monovalent ions than the permeate. The method may comprise producing the permeate with a monovalent ion concentration of from 2% to 10% lower than a monovalent ion concentration in the feed fluid. The method may comprise producing the permeate with a divalent ion concentration of from 50% to 90% lower than a divalent ion concentration in the feed fluid.

In some embodiments, operating the sub-system includes treating the feed fluid in an electrodialysis unit having one or more monovalent selective membranes. The method may comprise separating the feed fluid into a diluate stream and a concentrate stream and preferentially transport monovalent ions from the diluate stream to the concentrate stream in the electrodialysis unit. increasing a concentration of monovalent ions in the concentrate stream by from 3% to 400% relative to the feed liquid.

In some embodiments, operating the sub-system includes treating the feed fluid in an electrodialysis unit having one or more bipolar membranes and providing a fluid stream having an increased acidity relative to the feed fluid from an outlet of the electrodialysis unit to an inlet of the electrolyzer.

In some embodiments, operating the sub-system includes treating the feed fluid in an electrodialysis unit having one or more bipolar membranes and providing a fluid stream having an increased acidity relative to the feed fluid from an outlet of the electrodialysis unit to an inlet of a nanofiltration unit disposed upstream of the electrolyzer. The method may further comprise separating the fluid stream into a retentate and a permeate with the nanofiltration unit, the retentate having a higher ratio of divalent ions to monovalent ions than the permeate and providing the permeate to an inlet of the electrolyzer.

In some embodiments, operating the sub-system includes treating the feed fluid in a nanofiltration unit having an outlet in fluid communication with an electrodialysis unit, the electrodialysis unit including one or more monovalent selective membranes, and delivering a concentrate stream from the electrodialysis unit to an inlet of the electrolyzer. The method may further comprise adding oxygen to the concentrate stream prior to the concentrate stream entering the inlet of the electrolyzer.

In some embodiments, operating the sub-system includes treating the feed fluid in an electrodialysis unit having one or more monovalent selective membranes, delivering a diluate stream from the electrodialysis unit to an inlet of a nanofiltration unit, delivering permeate from the nanofiltration unit to a concentrate stream inlet of the electrodialysis unit, and delivering a concentrate stream from the electrodialysis unit to an inlet of the electrolyzer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is a table of representative electrolyzer system parameters;

FIG. 3B is a table of representative electrolyzer system mass flow rates;

FIG. 3C is a table of representative hydrogen volume generation rates in an electrolyzer system;

FIG. 3D is a table of representative mass generation rates in an electrolyzer system;

FIG. 5 illustrates removal rates of select compounds in an example nanofiltration system;

FIG. 15B illustrates the composition of feed solution utilized for the system of FIG. 15A; and FIG. 15C illustrates results of testing of the system of FIG. 15A.

DETAILED DESCRIPTION

Figure 1A:
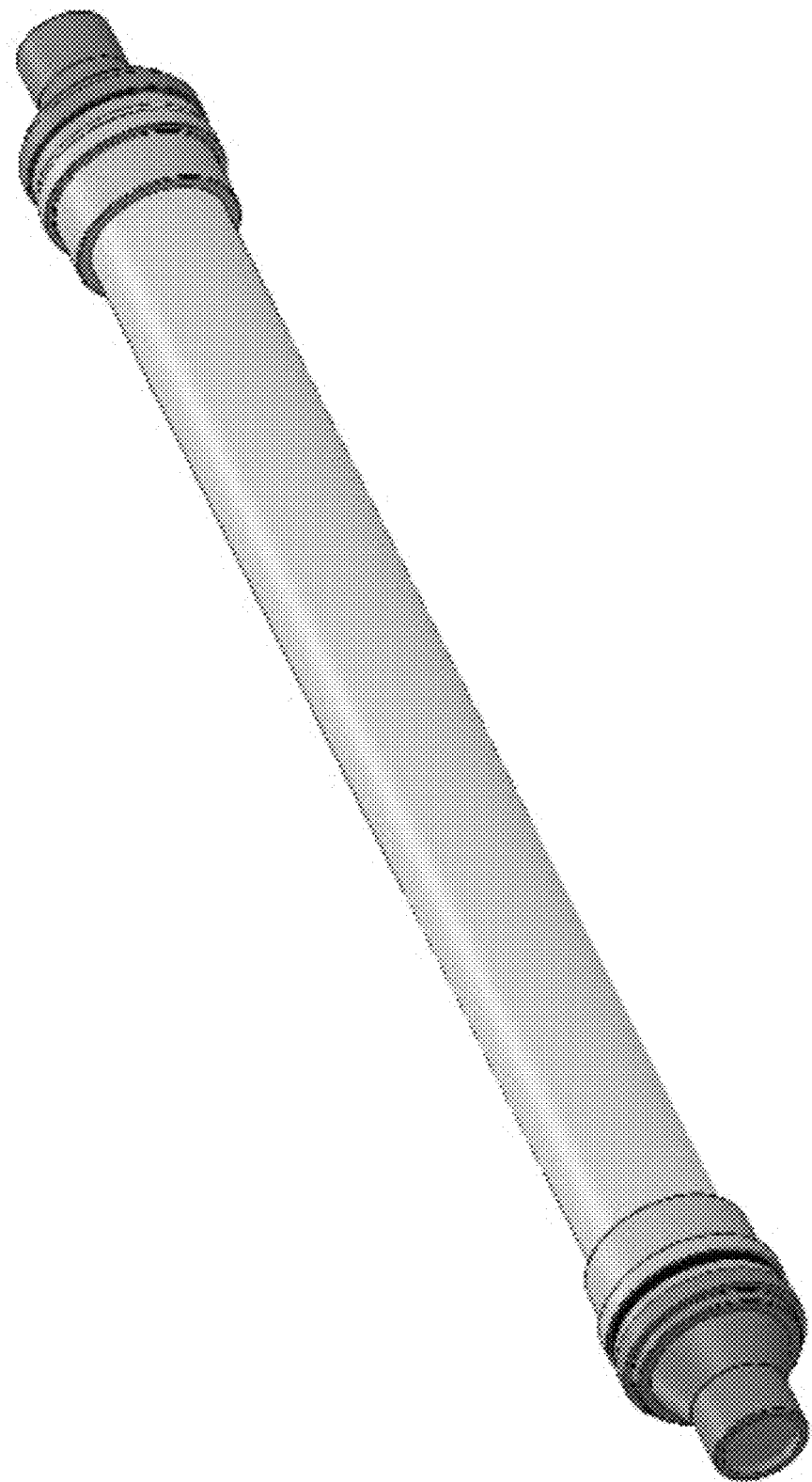
FIG. 1A is a perspective view of an embodiment of a multi-tube concentric tube electrolyzer cell.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

This disclosure describes various embodiments of systems including electrochlorination cells and electrochlorination devices, however, this disclosure is not limited to systems including electrochlorination cells or devices and the aspects and embodiments disclosed herein are applicable to systems including electrolytic and electrochemical cells used for any one of multiple purposes.

Current commercially electrochlorination cells are typically based on one of two electrode arrangements, concentric tubes (CTE) and parallel plates (PPE).

Aspects and embodiments disclosed herein are generally directed to systems including electrochemical devices to generate disinfectants such as sodium hypochlorite. The terms "electrochemical device" and "electrochemical cell" and grammatical variations thereof are to be understood to encompass "electrochlorination devices" and "electrochlorination cells" and grammatical variations thereof. Aspects and embodiments of electrochemical cells disclosed herein are described as including one or more electrodes.

Embodiments of electrochemical cells included in systems disclosed herein may include metal electrodes, for example, one or more anodes, one or more cathodes, and/or one or more bipolar electrodes. The term "metal electrodes" or grammatical variation thereof as used herein is to be understood to encompass electrodes formed from, comprising, or consisting of one or more metals, for example, titanium, aluminum, or nickel although the term "metal electrode" does not exclude electrodes including of consisting of other metals or alloys. In some embodiments, a "metal electrode" may include multiple layers of different metals. Metal electrodes utilized in any one or more of the embodiments disclosed herein may include a core of a high-conductivity metal, for example, copper or aluminum, coated with a metal or metal oxide having a high resistance to chemical attack by electrolyte solutions, for example, a layer of titanium, platinum, a mixed metal oxide (MMO), magnetite, ferrite, cobalt spinel, tantalum, palladium, iridium, silver, gold, or other coating materials. "Metal electrodes" may be coated with an oxidation resistant coating, for example, but not limited to, platinum, a mixed metal oxide (MMO), magnetite, ferrite, cobalt spinel, tantalum, palladium, iridium, silver, gold, or other coating materials. Mixed metal oxides utilized in embodiments disclosed herein may include an oxide or oxides of one or more of ruthenium, rhodium, tantalum (optionally alloyed with antimony and/or manganese), titanium, iridium, zinc, tin, antimony, a titanium-nickel alloy, a titanium-copper alloy, a titanium-iron alloy, a titanium-cobalt alloy, or other appropriate metals or alloys. Anodes utilized in embodiments disclosed herein may be coated with platinum and/or an oxide or oxides of one or more of iridium, ruthenium, tin, rhodium, or tantalum (optionally alloyed with antimony and/or manganese). Cathodes utilized in embodiments disclosed herein may be coated with platinum and/or an oxide or oxides of one or more of iridium, ruthenium, and titanium. Electrodes utilized in embodiments disclosed herein may include a base of one or more of titanium, tantalum, zirconium, niobium, tungsten, and/or silicon. Electrodes for any of the electrochemical cells in any of the systems disclosed herein can be formed as or from plates, sheets, foils, extrusions, and/or sinters.

Some aspects and embodiments of electrochemical cells included in systems disclosed herein are described as including rigid electrodes. As the term is used herein, a "rigid" object is one that maintains its shape in the absence of an applied force at a normal operating temperature and/or at an elevated temperature. A "rigid electrode," as the term is used herein, is considered to have sufficient mechanical stiffness such that it maintains its shape and separation between adjacent electrodes or electrode windings in the various embodiments of electrochemical cells and devices disclosed herein without the need for spacers. For example, a flexible film including a metal coating is not to be considered a "rigid electrode" as the term is used herein.

The term "tube" as used herein includes cylindrical conduits, however, does not exclude conduits having other cross-sectional geometries, for example, conduits having square, rectangular, oval, or obround geometries or cross-sectional geometries shaped as any regular or irregular polygon.

The terms "concentric tubes" or "concentric spirals" as used herein includes tubes or interleaved spirals sharing a common central axis but does not exclude tubes or interleaved spirals surrounding a common axis that is not necessarily central to each of the concentric tubes or interleaved spirals in a set of concentric tubes or interleaved spirals.

In some embodiments, a line passing from a central axis of an electrochlorination cell toward a periphery of the electrochlorination cell in a plane defined normal to the central axis passes through multiple electrode plates. The multiple electrode plates may include multiple anodes and/or multiple cathodes and/or multiple bipolar electrodes. The central axis may be parallel to an average direction of flow of fluid through the electrochemical cell.

In embodiments of electrochemical cells included in systems disclosed herein including multiple anode or cathode tube electrodes, the multiple anode tube electrodes may be referred to collectively as the anode or the anode tube, and the multiple cathode tube electrodes may be referred to collectively as the cathode or the cathode tube. In embodiments of electrochemical cells included in systems including multiple anode and/or multiple cathode tube electrodes, the multiple anode tube electrodes and/or multiple cathode tube electrodes may be collectively referred to herein as an anode-cathode pair.

In some aspects and embodiments of electrochemical cells included in systems disclosed herein including concentric tube electrodes, for example, one or more anodes and/or cathodes as disclosed herein, the electrodes are configured and arranged to direct fluid through one or more gaps between the electrodes in a direction parallel to a central axis of the electrochemical cell. In some aspects and embodiments of electrochemical cells including concentric tube electrodes, for example, one or more anodes and/or cathodes as disclosed herein, the electrodes are configured and arranged to direct all fluid introduced into the electrochemical cell through the one or more gaps between the electrodes in a direction parallel to a central axis of the electrochemical cell.

Electrochlorination cells are used in marine, offshore, municipal, industrial and commercial applications. The design parameters of electrochlorination cells including a plurality of concentric electrode tubes, for example, inter-electrode spacing, thickness of electrodes and coating density, electrode areas, methods of electrical connections, etc., can be selected for different implementations. Aspects and embodiments disclosed herein are not limited to the number of electrodes, the space between electrodes, the electrode material or spacer material, number of passes within the electrochlorination cells or electrode coating material.

PCT application PCT/US2016/018210 is incorporated herein by reference in entirety for all purposes.

Aspects and embodiments disclosed herein include systems and processes for the regulation of the composition of an electrolyzer feed stream. Through the use of these techniques, it is possible to decrease the rate of precipitate formation and increase the concentration of hypochlorite produced by an electrolyzer.

Configurations of concentric tubular electrolyzer (CTE) cells for improving system performance have been discussed in US 62/633,790 which is incorporated herein by reference in its entirety for all purposes. Electrolyzer systems including various arrangements of electrochemical cells (e.g., CTE systems including multiple CTE cells) are disclosed in PCT Application PCT/US2019/019072 which is incorporated herein by reference in its entirety for all purposes. In addition to the cell arrangement, however, CTE system performance strongly depends on its feed stream composition.

CTE systems are intended to operate with a seawater feed stream over a wide range of compositions, for example, as illustrated in Tables 1 and 2 below. The concentration of different dissolved solids in seawater may vary depending on location, however, one example of seawater may include the following components:

TABLE 1

Typical seawater components and concentrations

| Common name | Symbol | mg/l (ppm) |
|---|---|---|
| Chloride | Cl | 19,350 |
| Sodium | Na | 10,750 |
| Sulfate | $SO_4$ | 2,700 |
| Magnesium | Mg | 1,290 |
| Calcium | Ca | 410 |
| Potassium | K | 380 |
| Bicarbonate | $HCO_3$ | 140 |
| Bromide | Br | 65 |
| Strontium | Sr | 13 |
| Aluminum | Al | 1.9 |
| Silicon | Si | 1.1 |
| Fluoride | F | .8 |
| Nitrate | $NO_3$ | .8 |
| Boron | B | .4 |
| Barium | Ba | .2 |
| Iron | Fe | .1 |
| Manganese | Mn | .1 |
| Copper | Cu | .1 |
| Lithium | Li | .1 |
| Phosphorous | P | .06 |
| Iodide | I | .04 |
| Silver | Ag | .02 |
| Arsenic | As | <.01 |
| Nitrite | $NO_2$ | <.01 |
| Zinc | Zn | <.01 |
| Total: | | 35,000 (excluding H & O) |

The different ionic components of seawater from different locations are indicated in Table 2 below:

TABLE 2

Major Ion Composition of Seawater (mg/L)

| Ion | Typical Seawater | Eastern Mediterranean | Arabian Gulf at Kuwait | Red Sea at Jeddah |
|---|---|---|---|---|
| Chloride ($Cl^-$) | 18,980 | 21,200 | 23,000 | 22,219 |
| Sodium ($Na^+$) | 10,556 | 11,800 | 15,850 | 14,255 |

TABLE 2-continued

Major Ion Composition of Seawater (mg/L)

| Ion | Typical Seawater | Eastern Mediterranean | Arabian Gulf at Kuwait | Red Sea at Jeddah |
|---|---|---|---|---|
| Sulfate ($SO_4^{2-}$) | 2,649 | 2,950 | 3,200 | 3,078 |
| Magnesium ($Mg^{2+}$) | 1,262 | 1,403 | 1,765 | 742 |
| Calcium ($Ca^{2+}$) | 400 | 423 | 500 | 225 |
| Potassium ($K^+$) | 380 | 463 | 460 | 210 |
| Bicarbonate ($HCO_3^-$) | 140 | — | 142 | 146 |
| Strontium ($Sr^{2+}$) | 13 | — | — | — |
| Bromide ($Br^-$) | 65 | 155 | 80 | 72 |
| Borate ($BO_3^{3-}$) | 26 | 72 | — | — |
| Fluoride ($F^-$) | 1 | — | — | — |
| Silicate ($SiO_3^{2-}$) | 1 | — | 1.5 | — |
| Iodide ($I^-$) | <1 | 2 | — | — |
| Others | — | — | — | — |
| Total Dissolved Solids (TDS) | 34,483 | 38,600 | 45,000 | 41,000 |

The overall electrochemical reaction conditions for the generation of NaOCl from seawater in a CTE system are listed in the Background section of this disclosure in equation sets A1 and A2.

The major reaction product at the anode of a CTE system generating NaOCl from seawater is $Cl_2$. Anode current and the concentration of NaCl in solution regulate the rate at which $Cl_2$ is produced, which in turn determines the amount of NaOCl formed in solution. The amount of NaOCl formed relative to the volumetric flow rate of the system dictates the overall product strength.

The major reaction products at the cathode of a CTE system generating NaOCl from seawater are $H_2$ and $OH^-$. Current, and therefore cathode current density, regulates the rate at which they are produced, and those production rates impact pH within the system.

Although the bulk pH of seawater is generally 7.5-8.4, the kinetics of the above reactions, along with other factors, drive pH within the system.

Above its solubility, $H_2$ will outgas as it is produced in a CTE cell, displacing fluid volume and blinding the cathode. Decreasing the local fluid volume while maintaining the same $OH^-$ production rate will increase local pH at the cathode.

Local $OH^-$ concentration at the cathode of a CTE cell is also a function of velocity, since turbulence, and therefore mixing, are a function of velocity. Decreasing the flow rate will therefore also increase the local cathode pH.

At a pH threshold of 8, seawater is supersaturated with $CaCO_3$. At a pH threshold of 10.7-11, $Mg(OH)_2$ begins to form. Both of these species will impair the performance of a CTE cell.

Varying the concentrations of $Mg^{2+}$ and $Ca^{2+}$ in solution will also impact both the rate and amount of precipitate formation.

Variations in the TDS of the process stream will affect its conductivity, and thus the overall power consumption of an electrolyzer, since cell voltage and conductivity are inversely related.

Figure 1B:
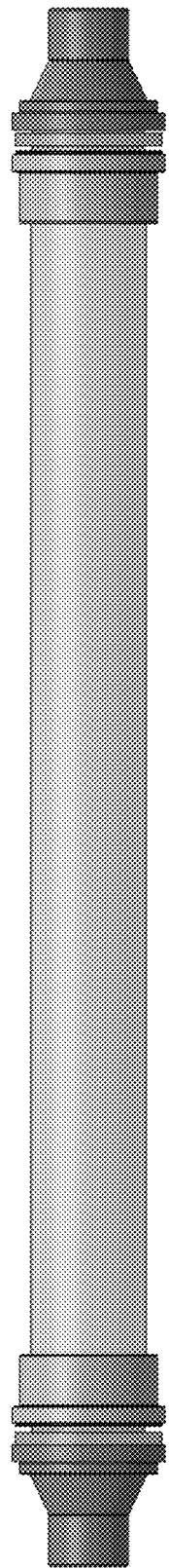
FIG. 1B is a side view of the concentric tube electrolyzer cell of FIG. 1A.
Figure 1C:
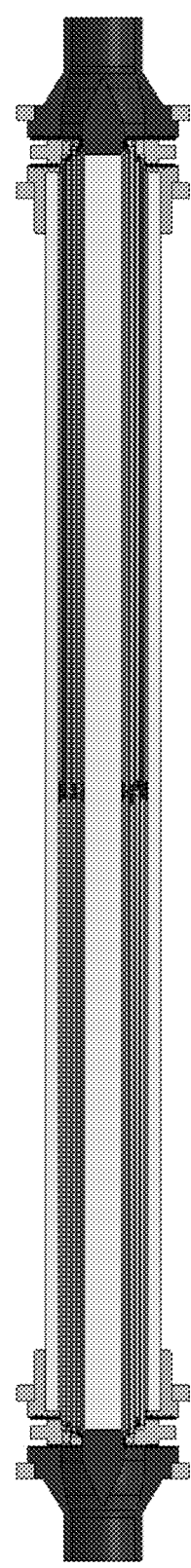
FIG. 1C is a cross-sectional view of the concentric tube electrolyzer cell of FIG. 1A.
Figure 2:
FIG. 2 illustrates an electrolyzer system including 20 electrochemical cells fluidically connected in series.

A current Evoqua state of art CTE cell is shown in FIGS. 1A-1C. An example system comprising twenty CTE cells hydraulically in series is shown in FIG. 2. Parameters of particular note include the volumetric flow rate of seawater (FIG. 3A), the mass flow rates of FIG. 3B, the volumetric generation rates of $H_2$ (FIG. 3C), and the mass generation rates of FIG. 3D.

At a flow velocity of 2-3 m/s, a system as illustrated in FIG. 2 is capable of self-cleaning operation, assuming a feed stream with $Na^+$ concentrations between about 10,000 and 16,000 ppm, $Cl^-$ concentrations between about 18,000 and 23,000 ppm, $Mg^{2+}$ concentrations between about 750 and 1,800 ppm, and $Ca^{2+}$ concentrations between about 200 and 500 ppm.

For these feed conditions, NaOCl output concentrations between about 2,000 ppm and about 3,000 ppm are achievable. Again, this product strength is theoretically limited by the rate of precipitate formation and by the amount of NaCl in solution. To improve the performance of an electrochlorination system, one may, for example:

Mitigate precipitation (via pH regulation or $Mg^{2+}/Ca^{2+}$ removal); and/or
Increase the concentration of NaCl in the feed stream Regulation of Process Stream Composition Techniques exist to compensate for divalent hardness and/or enhance monovalent salt concentrations. For systems as described above, however, many processes are impractical. Examples of both suitable and unsuitable processes are listed below.

Unsuitable:
Anti-scalant dosing: Reagent cost for the mass to be treated is prohibitive
Chelation: Reagent cost for the mass to be treated is prohibitive
Distillation: Energy costs to treat the required volumes are prohibitive
Electrodeionization (EDI): Requires a low hardness feed, outside of the process range
Ion exchange: Requires manned operation; cost and hazardous nature of regenerative chemicals is prohibitive
Lime softening/Clark's process: Requires manned operation; mass for treatment and sludge disposal costs are prohibitive
Magnetic water treatment (AMT): Unproven process, with little supporting data.

Figure 4:
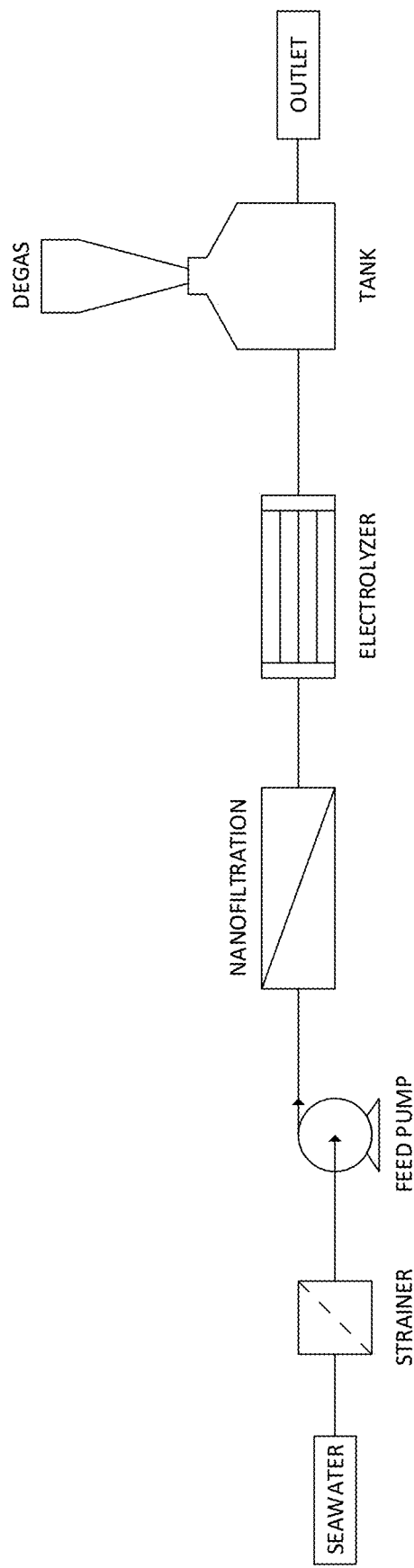
FIG. 4 illustrates a system to adjust feed stream composition of an electrolyzer system via nanofiltration.

Suitable:
Acid dosing: Acid injection can reduce pH, which may mitigate scale formation
Capacitive Deionization (CAPDI): Can reduce divalent and enhance monovalent ion concentrations; relatively low energy (cyclical adsorption/desorption)
Nanofiltration/Reverse osmosis: Can reduce divalent ion concentrations, with a concurrent reduction in monovalent ion concentrations; relatively low energy
Electrodialysis (ED): Can selectively transport monovalent ions and/or generate acid Non-Limiting Embodiments FIG. 4 depicts a system to adjust feed stream composition via nanofiltration (NF). The use of NF to reduce divalent hardness, specifically $Mg^{2+}$ and $Ca^{2+}$, and thus prevent electrolyzer precipitation, is believed to be novel. The NF unit separates the seawater into a retentate and a filtrate, the retentate having a higher ratio of divalent ions to monovalent ions than the filtrate. A filtrate outlet of the NF unit provides the filtrate to an inlet of the electrolyzer. Reference data for such a NF system is included in FIG. 5 (reproduced from Telzhensky, M., Birnhack, L., Lehmann, O., Windier, E., Lahav, O. Selective separation of seawater $Mg^{2+}$ ions for use in downstream water treatment processes. Chemical Engineering Journal 175 (2011) 136-143).

In this configuration, monovalent ion concentrations may be reduced by roughly 2-10%, while divalent ion concentrations may be reduced by roughly 50-90%.

Figure 6:
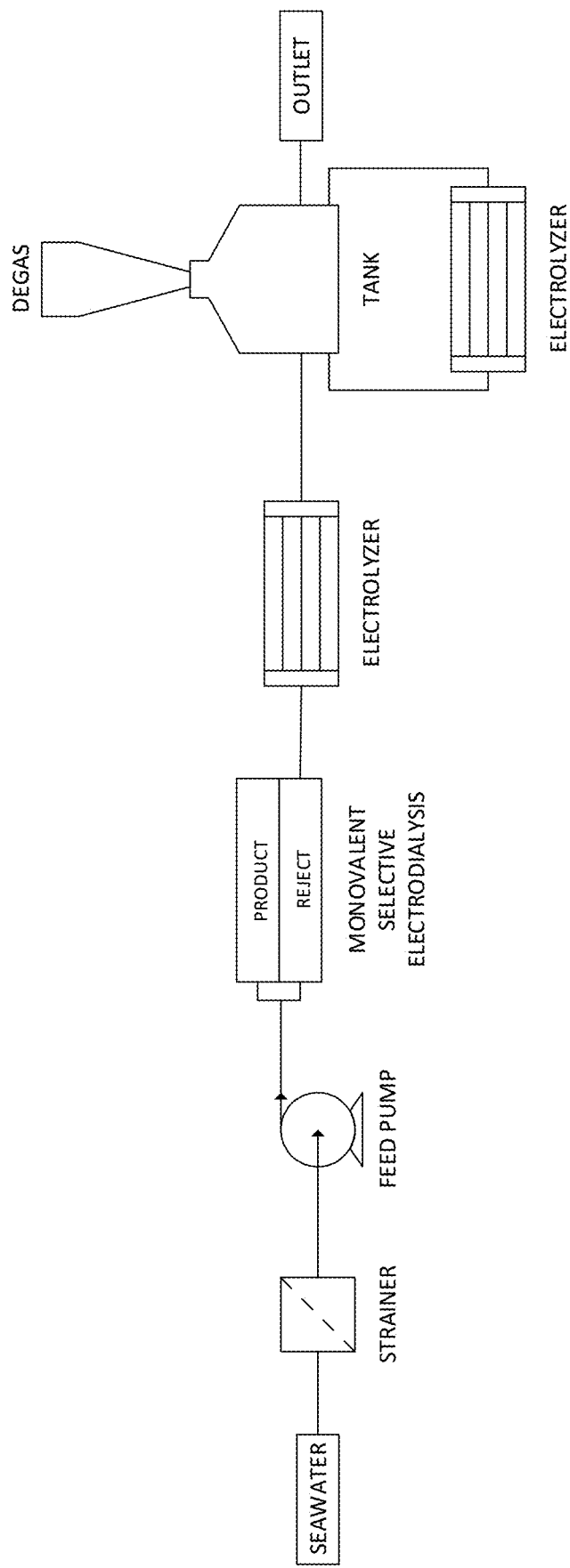
FIG. 6 illustrates a system to adjust feed stream composition of an electrolyzer system via electrodialysis.
Figure 7A:
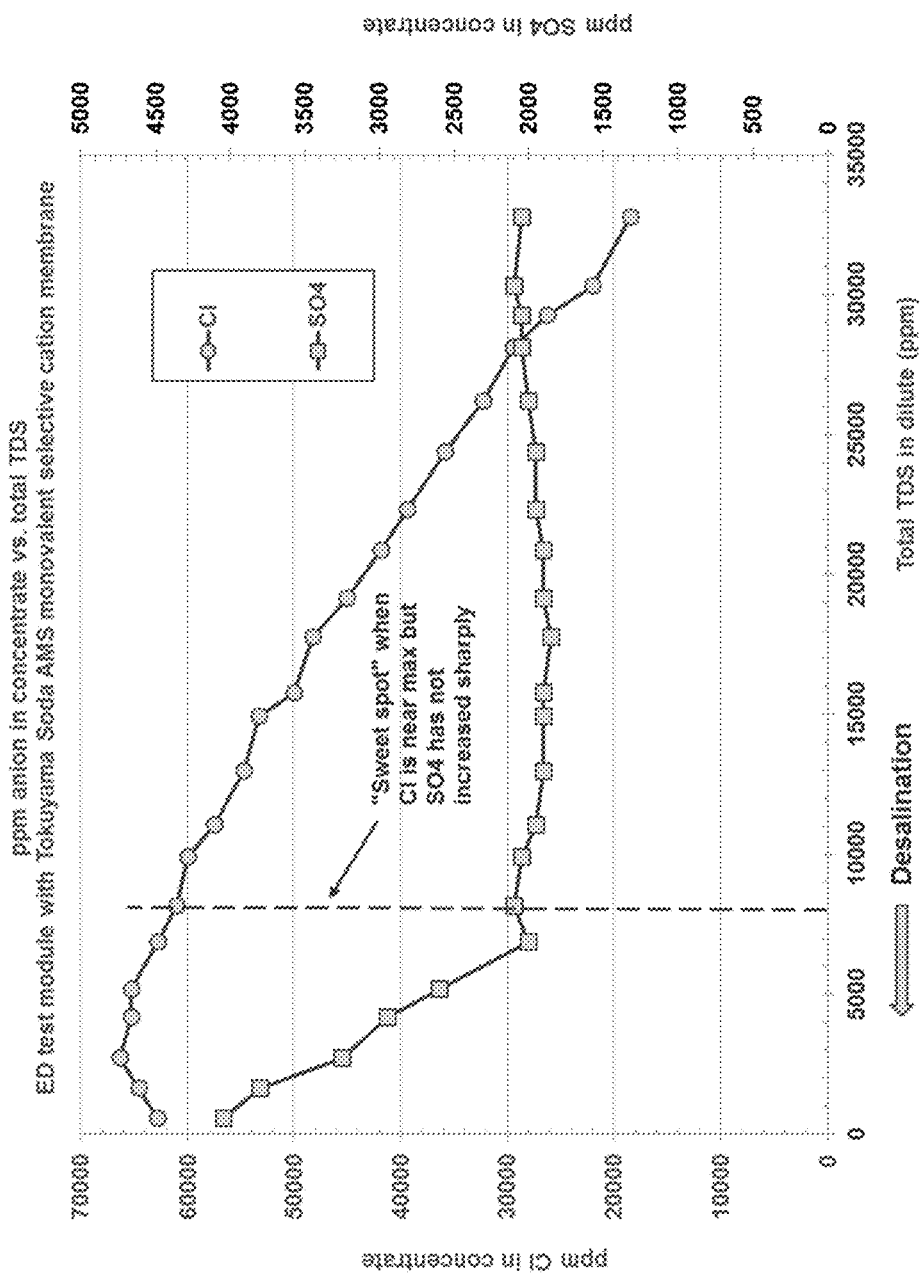
FIG. 7A illustrates relative levels of $Cl^-$ and $SO_4^{2-}$ as a function of total TDS in seawater concentrate from an example electrodialysis module.
Figure 7B:
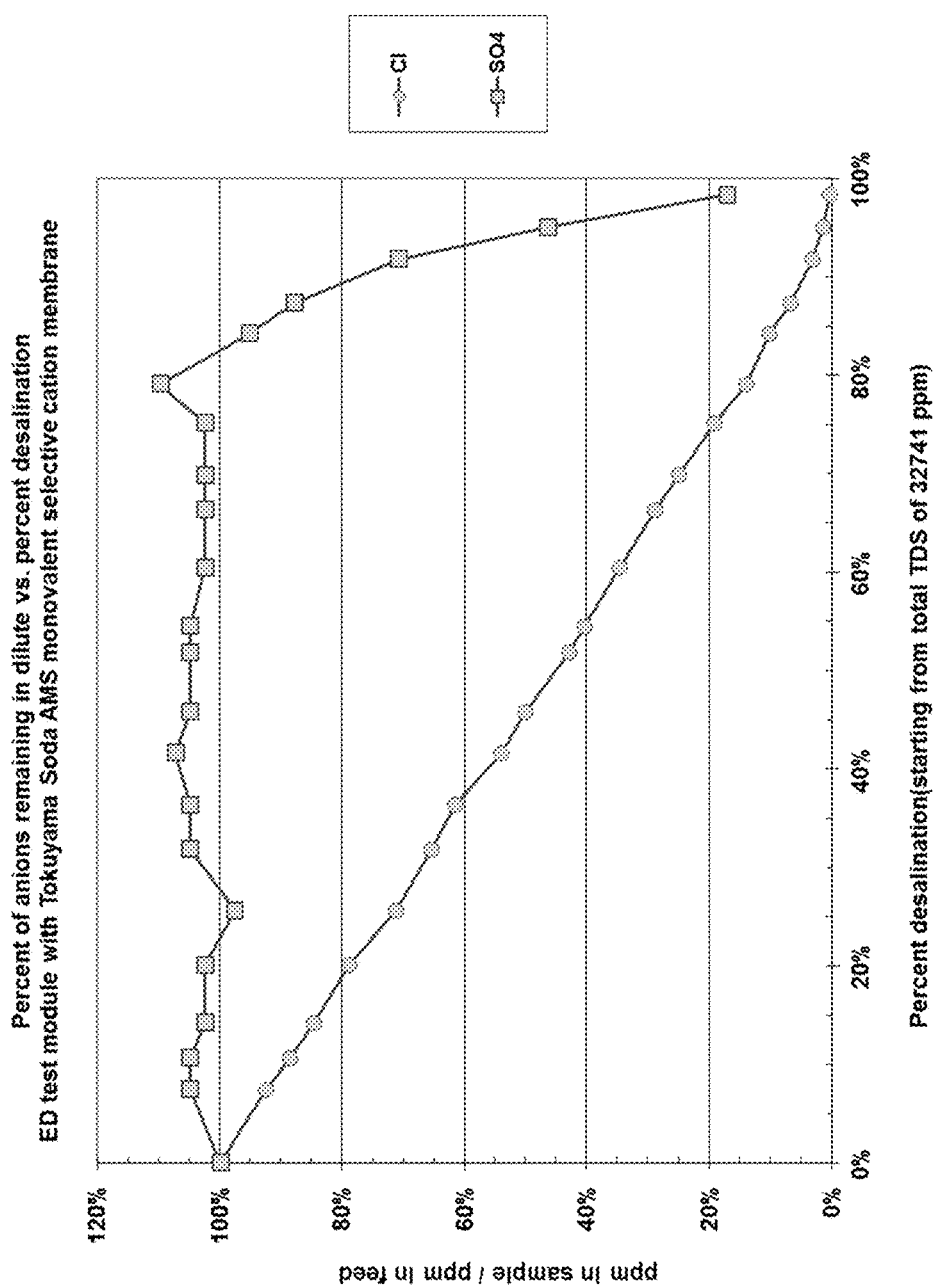
FIG. 7B illustrates relative levels of $Cl^-$ and $SO_4^{2-}$ as a function of desalination percent in an example electrodialysis module.
Figure 8A:
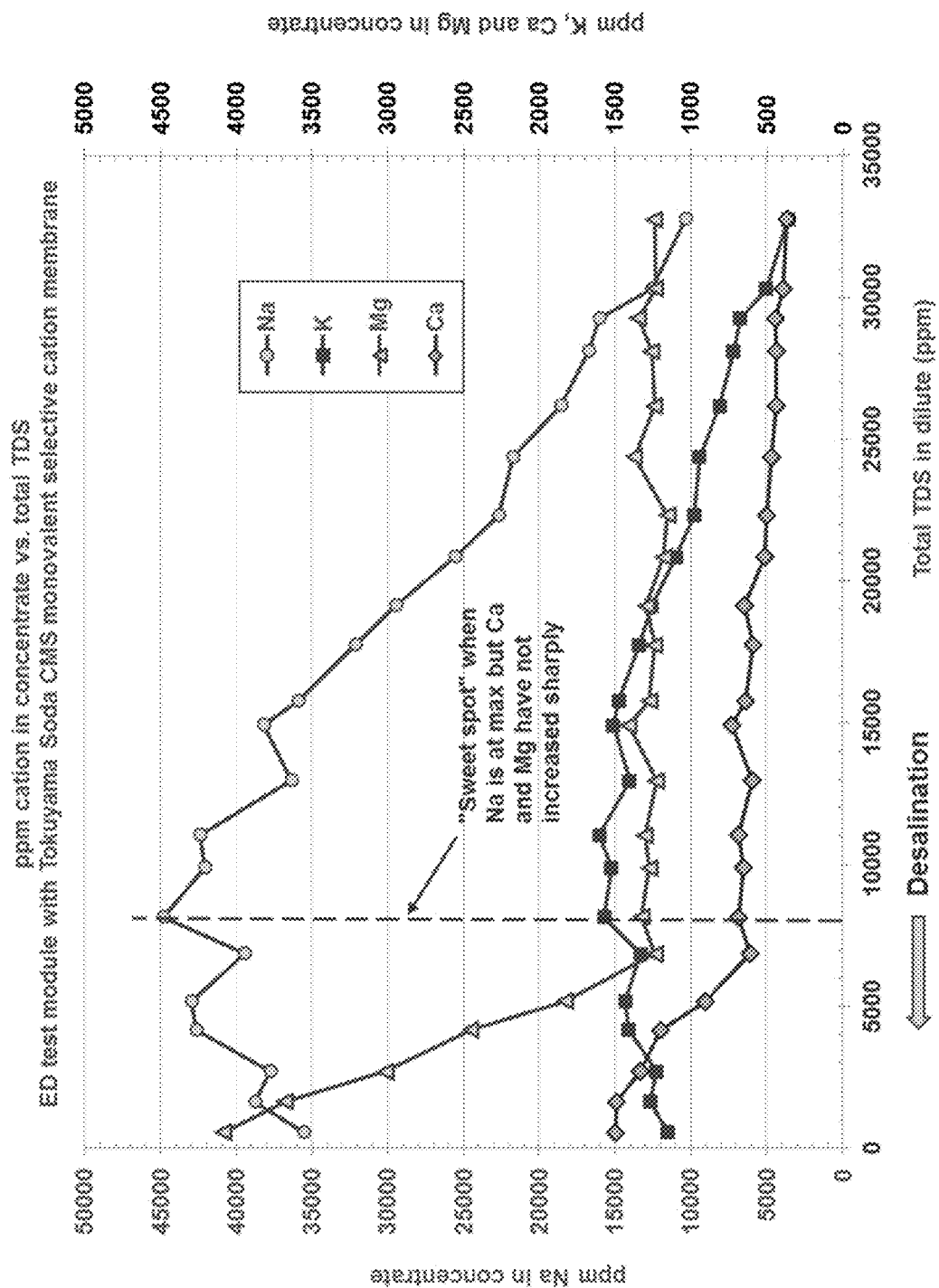
FIG. 8A illustrates relative levels of select cations as a function of total TDS in seawater concentrate from an example electrodialysis module.
Figure 8B:
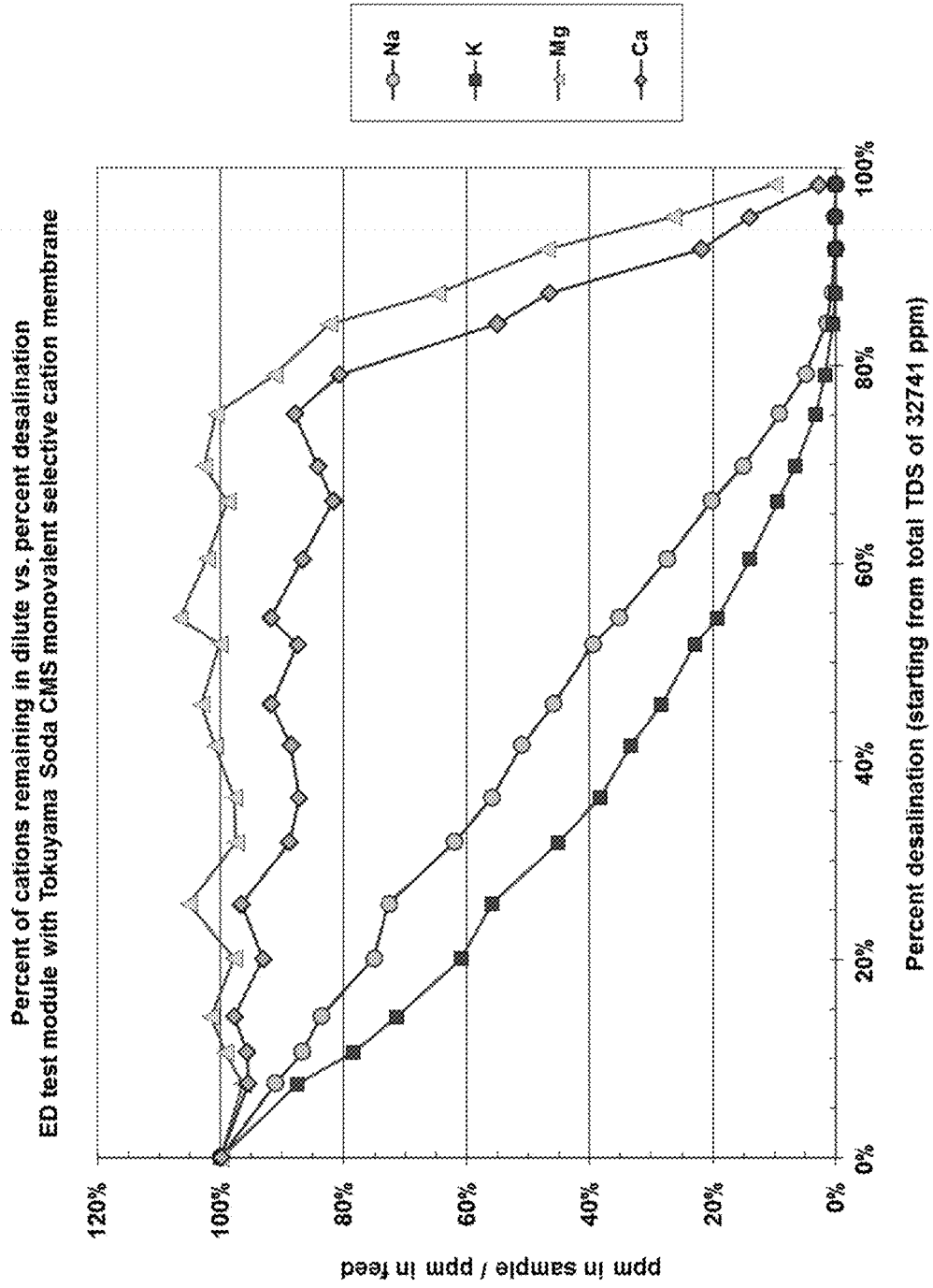
FIG. 8B illustrates relative levels of select cations as a function of desalination percent in an example electrodialysis module.

FIG. 6 depicts a system to adjust feed stream composition via electrodialysis (ED). Such a system would make use of monovalent selective membranes to preferentially transport monovalent ions from the dilute to the concentrate stream. Reference data for such a process is included in FIGS. 7A-8B. FIGS. 7A-7B illustrate the performance of an example of an ED system utilizing monovalent-selective membranes. With increasing treatment (decreasing in TDS or increasing degree of desalination) the monovalent ions (Cl, Na, K) quickly move from the dilute to the concentrate stream, while the divalent ions ($SO_4$, Mg, Ca) remain in the concentrate stream until a high degree of TDS removal/desalination is achieved. In this configuration, monovalent ion concentrations in the concentrate stream may be increased by roughly 3%-400%, with no concurrent change in the concentration of divalent ion species.

Figure 9A:
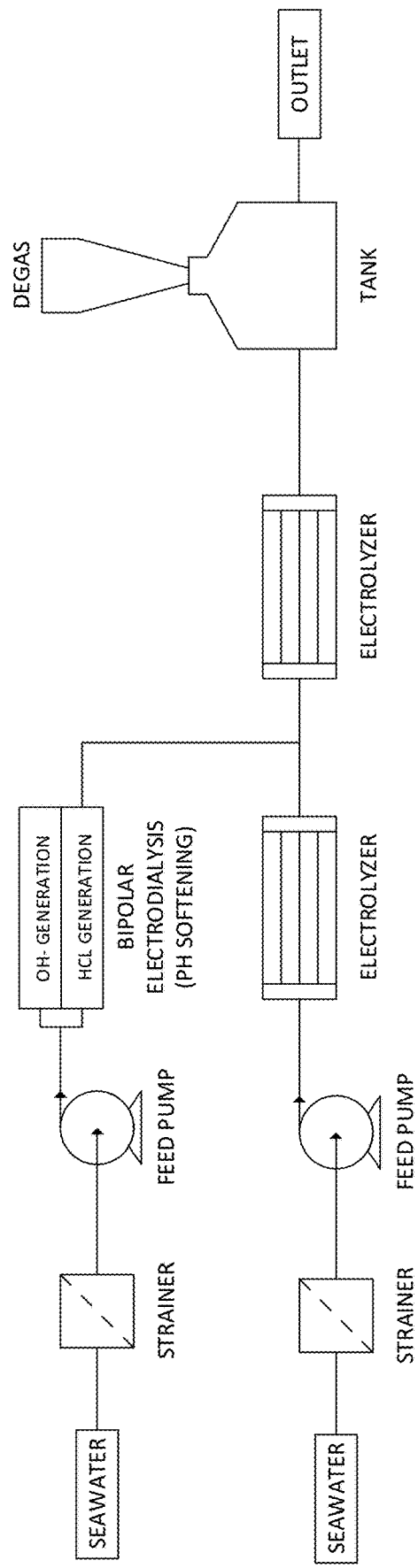
FIG. 9A illustrates a system to adjust an electrolyzer feed stream pH via electrodialysis.
Figure 9B:
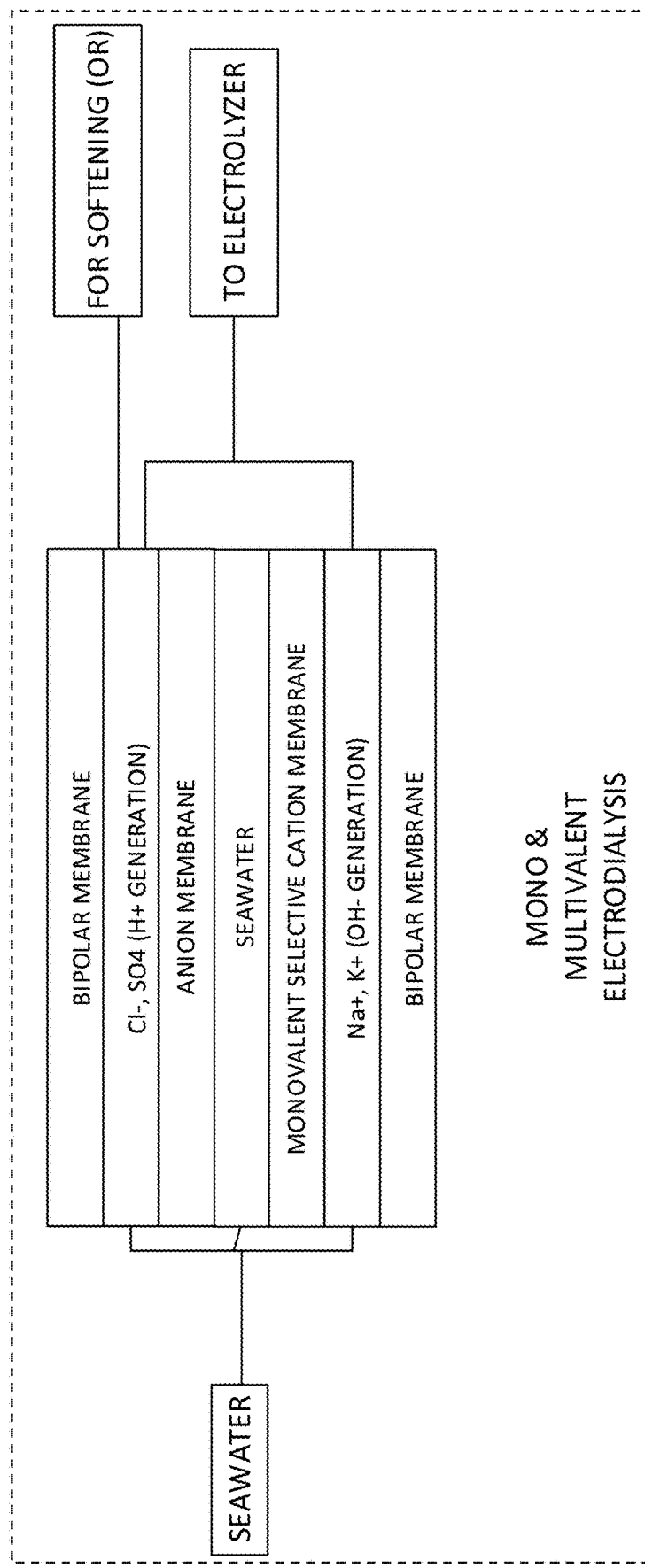
FIG. 9B Illustrates the bipolar electrodialysis module of FIG. 9A in greater detail.
Figure 10:
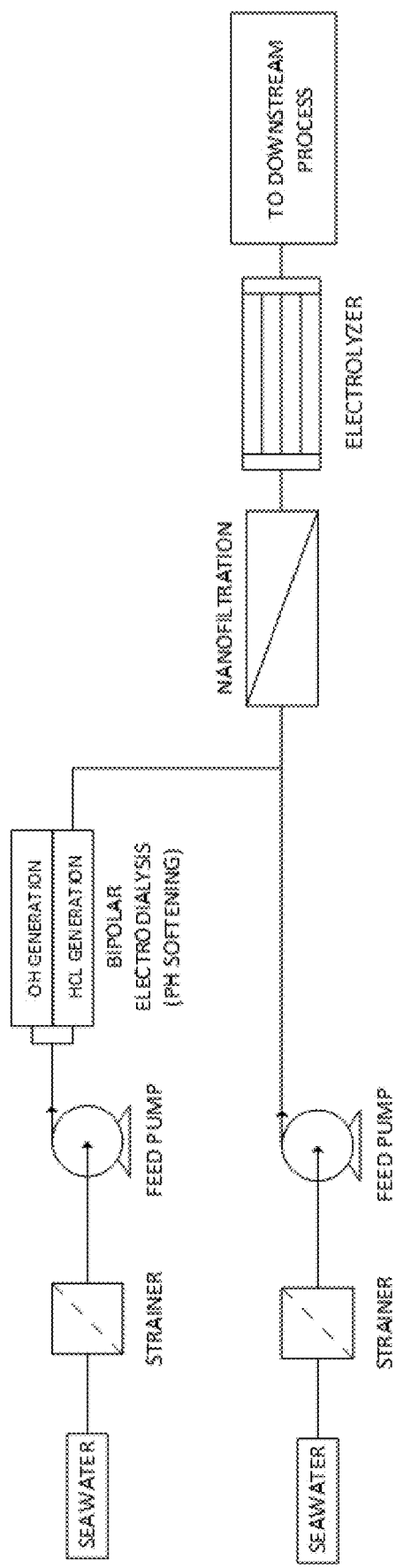
FIG. 10 illustrates a system to adjust an electrolyzer feed stream pH via nanofiltration.

FIG. 9A depicts a system to adjust electrolyzer feed stream pH via ED. This system makes use of bipolar membranes to generate $H^+$ and $OH^-$ (FIG. 9A). $H^+$ can be used to adjust pH either at the electrolyzer (FIG. 9B), or at an NF module (FIG. 10).

Figure 11A:
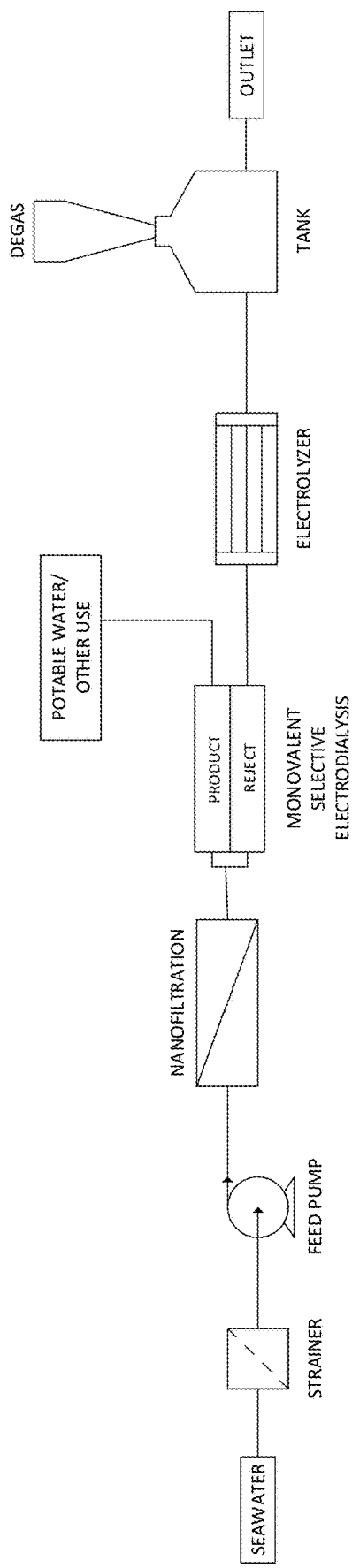
FIG. 11A illustrates a system combining nanofiltration and electrodialysis to adjust an electrolyzer feed stream.
Figure 11B:
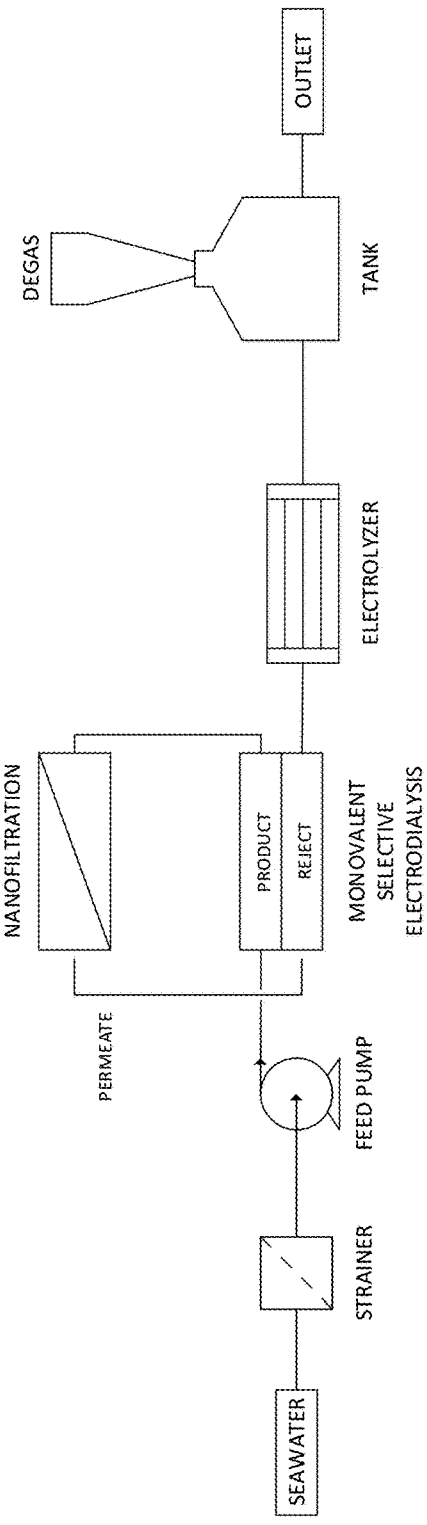
FIG. 11B illustrates another system combining nanofiltration and electrodialysis to adjust an electrolyzer feed stream.

FIGS. 11A and 11B depict systems combining NF and ED to adjust the electrolyzer feed stream. In the system of FIG. 11A, NF is used to reduce divalent hardness. The retentate stream from the NF feeds both the dilute and concentrate streams of a monovalent selective ED module. As bromide ions would pass to the concentrate stream, the dilute stream of the monovalent selective ED module could be used for other applications, such as potable or cooling water. The concentrate stream, with reduced divalent and increased monovalent ion concentrations, could then be used as the feed stream for the electrolyzer.

In the system of FIG. 11B, the diluting stream of a monovalent selective ED module is first used to reduce the concentration of monovalent ions in the feed stream. The dilute stream of the ED device is then used as the feed for an NF module, to reduce divalent hardness. The permeate of the NF module is then fed to the concentrate stream of the ED device, conserving the overall concentration of monovalent ions.

Figure 12A:
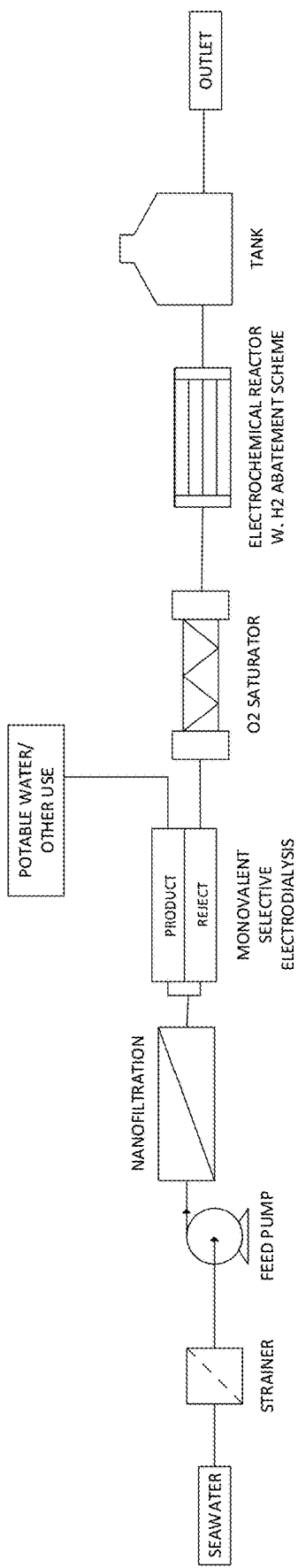
FIG. 12A illustrates a system to adjust feed stream composition, coupled with an electrolyzer configured for reaction product abatement.
Figure 12B:
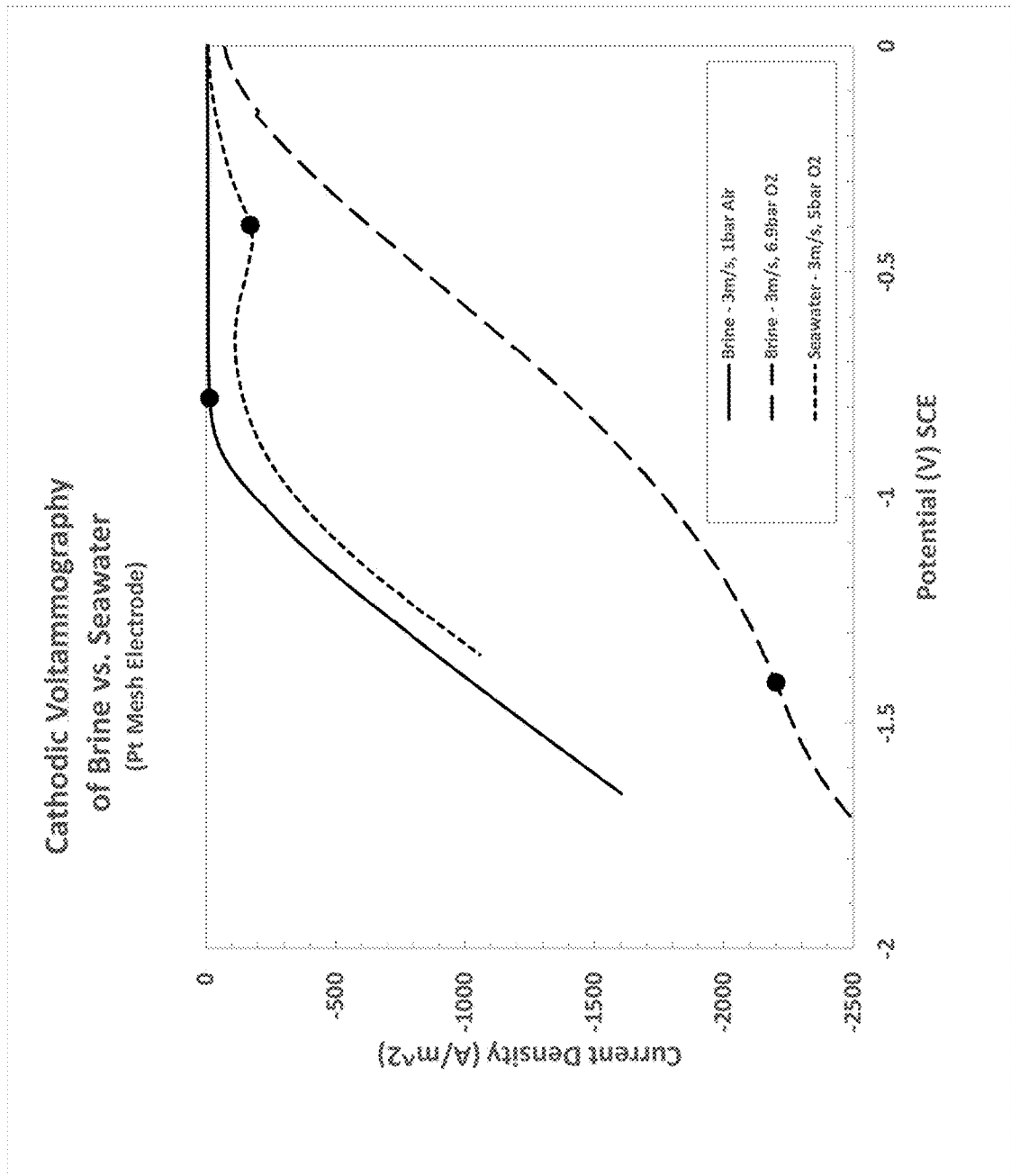
FIG. 12B illustrates the relative performance of hydrogen abatement for different feed solutions to an electrolyzer.

FIG. 12A depicts a system to adjust feed stream composition, coupled with an electrolyzer including features for reaction product abatement. Previous experiments comparing reaction product abatement for varying feed compositions, specifically seawater and brine, found that the presence of $Mg^{2+}$ hardness resulted in cathodic masking, and a reduction in operational current density, from about 2,200 to 200 A/m² (FIG. 12B) with a concurrent shift from oxygen consumption to hydrogen generation. In FIG. 12B, the shift from oxygen consumption to hydrogen generation occurs at the inflection point marked in each of the lines. The "Brine—3 m/s, 1 bar Air" line represents performance without any improvements. The "Brine—3 m/s, 6.9 bar O2" line represents the fully realized performance enhancement. The "Seawater—3 m/s, 5 bar O2" line illustrates the diminished performance caused by Mg interference. By eliminating divalent hardness, specifically $Mg^{2+}$ utilizing, for example, the nanofiltration unit illustrated in FIG. 12A, an electrolyzer system capable of generating NaOCl without hydrogen would then be possible. An oxygen saturator may also be provided to introduce oxygen into the electrochemical reactor feed stream to react with dissolved $H^+$ to form water and prevent the $H^+$ from coming out of solution.

A controller used for monitoring and controlling operation of the various elements of embodiments of the systems disclosed herein may include a computerized control system. Various aspects of the controller may be implemented as specialized software executing in a general-purpose computer system 1000 such as that shown in FIG. 13. The computer system 1000 may include a processor 1002 connected to one or more memory devices 1004, such as a disk drive, solid state memory, or other device for storing data. Memory 1004 is typically used for storing programs and data during operation of the computer system 1000. Components of computer system 1000 may be coupled by an interconnection mechanism 1006, which may include one or more busses (e.g., between components that are integrated within a same machine) and/or a network (e.g., between components that reside on separate discrete machines). The interconnection mechanism 1006 enables communications (e.g., data, instructions) to be exchanged between system components of system 1000. Computer system 1000 also includes one or more input devices 1008, for example, a keyboard, mouse, trackball, microphone, touch screen, and one or more output devices 1010, for example, a printing device, display screen, and/or speaker.

The output devices 1010 may also comprise valves, pumps, or switches which may be utilized to introduce product water (e.g. brackish water or seawater) from the feed source into an electrochlorination system as disclosed herein or a point of use and/or to control the speed of pumps. One or more sensors 1014 may also provide input to the computer system 1000. These sensors may include, for example, pressure sensors, chemical concentration sensors, temperature sensors, fluid flow rate sensors, or sensors for any other parameters of interest to an operator of an electrochlorination system. These sensors may be located in any portion of the system where they would be useful, for example, upstream of point of use and/or an electrochlorination system or in fluid communication with a feed source. In addition, computer system 1000 may contain one or more interfaces (not shown) that connect computer system 1000 to a communication network in addition or as an alternative to the interconnection mechanism 1006.

Figure 14:
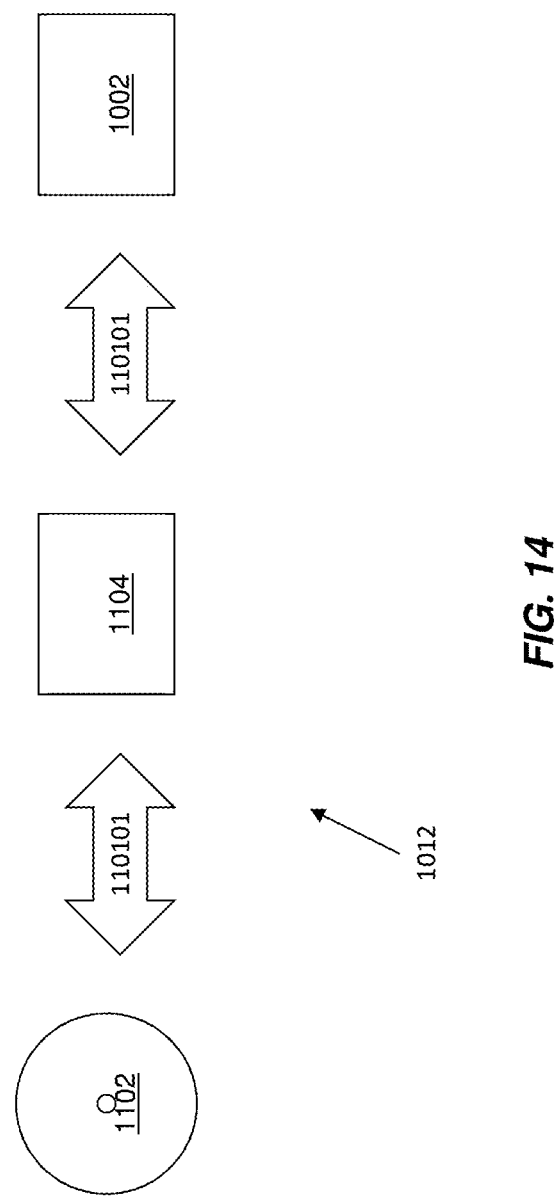
FIG. 14 illustrates a memory system for the control system of FIG. 13.

The storage system 1012, shown in greater detail in FIG. 14, typically includes a computer readable and writeable nonvolatile recording medium 1102 in which signals are stored that define a program to be executed by the processor 1002 or information to be processed by the program. The medium may include, for example, a disk or flash memory. Typically, in operation, the processor causes data to be read from the nonvolatile recording medium 1102 into another memory 1104 that allows for faster access to the information by the processor than does the medium 1102. This memory 1104 is typically a volatile, random access memory such as a dynamic random access memory (DRAM) or static memory (SRAM). It may be located in storage system 1012, as shown, or in memory system 1004. The processor 1002 generally manipulates the data within the integrated circuit memory 1104 and then copies the data to the medium 1102 after processing is completed. A variety of mechanisms are known for managing data movement between the medium 1102 and the integrated circuit memory element 1104, and aspects and embodiments disclosed herein are not limited thereto. Aspects and embodiments disclosed herein are not limited to a particular memory system 1004 or storage system 1012.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 13:
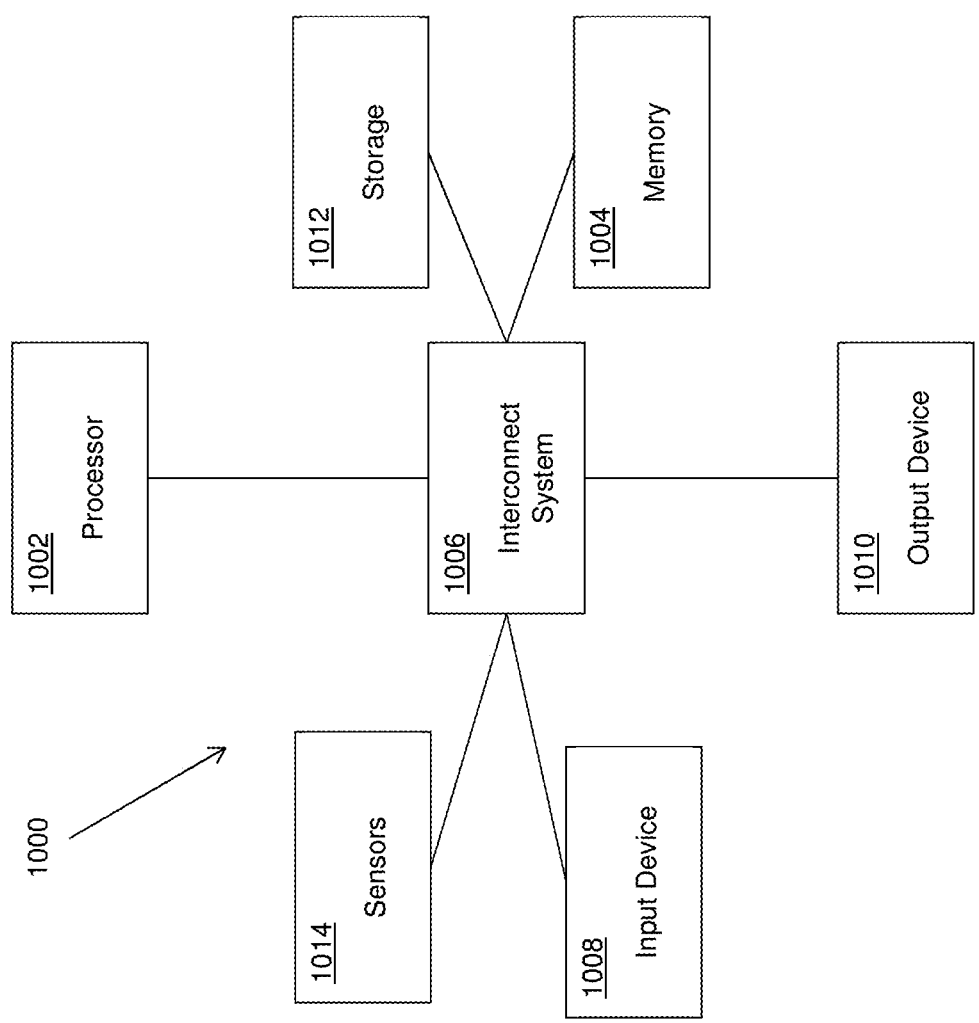
FIG. 13 illustrates a control system for embodiments of electrochemical cells and systems disclosed herein.

Although computer system 1000 is shown by way of example as one type of computer system upon which various aspects and embodiments disclosed herein may be practiced, it should be appreciated that aspects and embodiments disclosed herein are not limited to being implemented on the computer system as shown in FIG. 13. Various aspects and embodiments disclosed herein may be practiced on one or more computers having a different architecture or components that that shown in FIG. 13.

Computer system 1000 may be a general-purpose computer system that is programmable using a high-level computer programming language. Computer system 1700 may be also implemented using specially programmed, special purpose hardware. In computer system 1000, processor 1002 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C #(C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

EXAMPLE

Figure 15A:
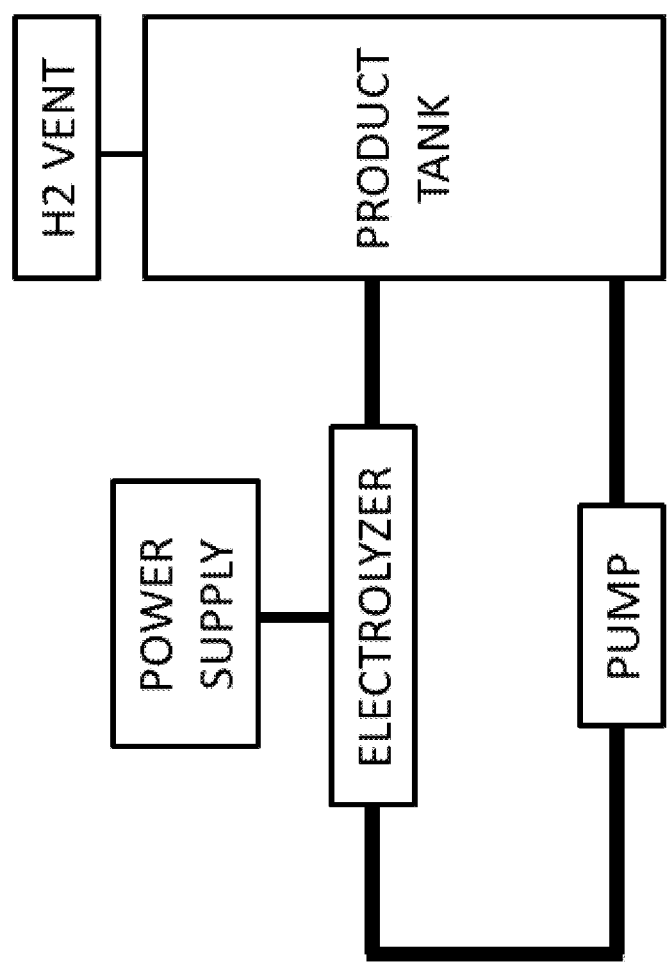
FIG. 15A illustrates the setup of a test system to evaluate performance of a recirculating electrolyzer system.

FIG. 15A depicts a recirculating electrolyzer system that has been tested.

In this setup, a 3.5% Instant Ocean® synthetic seawater solution (FIG. 15B) was prepared within the product tank. That solution was then recirculated through the electrolyzer for varying lengths of time (FIG. 15C, 7-120 min), while power was applied across the cell. $H_2$ gas was vented as it was generated, and the NaOCl product was allowed to accumulate.

Per the background discussion, it is believed that venting $H_2$ would prevent cathodic blinding, thus maintaining the local pH near the bulk value and mitigating $Mg(OH)_2$ scale. As confirmation, the bulk pH was measured to be between 8.6 and 8.8, and no observable precipitation was formed.

After sustained operation, the NaOCl product strength was measured via iodometric titration. Product strengths between about 750 and 6,200 ppm (FIG. 15C) were achieved. Such results represent a significant improvement over the current state of art.

It is anticipated that, through the regulation of feed stream composition, the aspects and embodiments disclosed herein would be able to achieve similar or greater performance The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. An electrochlorination system comprising:
   an electrolyzer fluidically connectable between a source of feed fluid and a product fluid outlet; and
   a sub-system configured to increase a pH of the feed fluid and increase a ratio of monovalent to divalent ions in the feed fluid, upstream of the electrolyzer.

2. The system of claim 1, wherein the sub-system comprises a nanofiltration unit having an inlet fluidly connectable to the source of feed fluid and configured to separate the feed fluid into a retentate and a permeate, the retentate having a higher ratio of divalent ions to monovalent ions than the permeate, and a permeate outlet configured to provide the permeate to an inlet of the electrolyzer.

3. The system of claim 2, wherein the nanofiltration unit is configured to produce the permeate with a monovalent ion concentration of from 2% to 10% lower than a monovalent ion concentration in the feed fluid.

4. The system of claim 2, wherein the nanofiltration unit is configured to produce the permeate with a divalent ion concentration of from 50% to 90% lower than a divalent ion concentration in the feed fluid.

5. The system of claim 1, wherein the sub-system comprises an electrodialysis unit having an inlet fluidly connectable to the source of feed fluid, one or more monovalent selective membranes, and a concentrate stream outlet in fluid communication with an inlet of the electrolyzer.

6. The system of claim 5, wherein the electrodialysis unit is configured to separate the feed fluid into a diluate stream and a concentrate stream and preferentially transport monovalent ions from the diluate stream to the concentrate stream.

7. The system of claim 6, wherein the electrodialysis unit is configured to increase a concentration of monovalent ions in the concentrate stream by from 3% to 400% relative to the feed liquid.

8. The system of claim 1, wherein the sub-system comprises a nanofiltration unit having an inlet fluidly connectable to the source of feed fluid and an outlet in fluid communication with an electrodialysis unit, the electrodialysis unit including one or more monovalent selective membranes and a concentrate stream outlet in fluid communication with an inlet of the electrolyzer.

9. The system of claim 8, further comprising an oxygen saturation unit in fluid communication between the electrodialysis unit and the electrolyzer and configured to add oxygen to the concentrate stream prior to the concentrate stream entering the inlet of the electrolyzer.

10. An electrochlorination system comprising:
    an electrolyzer fluidically connectable between a source of feed fluid and a product fluid outlet; and
    a sub-system configured to one of increase a pH of the feed fluid or increase a ratio of monovalent to divalent ions in the feed fluid, upstream of the electrolyzer, the sub-system comprising an electrodialysis unit having an inlet fluidly connectable to the source of feed fluid, one or more monovalent selective membranes, a diluate stream outlet in fluid communication with an inlet of a nanofiltration unit, a concentrate stream inlet in fluid communication with a permeate outlet of the nanofiltration unit, and a concentrate stream outlet in fluid communication with an inlet of the electrolyzer.

* * * * *